US010819758B1

(12) United States Patent
Krutsch et al.

(10) Patent No.: US 10,819,758 B1
(45) Date of Patent: Oct. 27, 2020

(54) LIVE MULTIPARTY AUDIO-VISUAL COMMUNICATION LINKING SYSTEM AND METHOD

(71) Applicant: See A Star LLC, Wayzata, MN (US)

(72) Inventors: Kenneth F. Krutsch, Minnetonka, MN (US); Emma C. Aversa, Minneapolis, MN (US)

(73) Assignee: See A Star LLC, Wayzata, MN (US)

( * ) Notice: Subject to any disclaimer, the term of this patent is extended or adjusted under 35 U.S.C. 154(b) by 0 days.

(21) Appl. No.: 16/862,372

(22) Filed: Apr. 29, 2020

Related U.S. Application Data

(60) Provisional application No. 62/839,865, filed on Apr. 29, 2019.

(51) Int. Cl.
| | |
|---|---|
| *H04N 7/15* | (2006.01) |
| *H04L 29/06* | (2006.01) |
| *G06F 16/955* | (2019.01) |
| *G06Q 30/08* | (2012.01) |
| *H04L 29/08* | (2006.01) |
| *G06Q 20/12* | (2012.01) |
| *G06Q 50/00* | (2012.01) |

(52) U.S. Cl.
CPC ...... *H04L 65/1069* (2013.01); *G06F 16/9566* (2019.01); *G06Q 20/127* (2013.01); *G06Q 30/08* (2013.01); *H04L 67/02* (2013.01); *H04L 67/325* (2013.01); *H04N 7/15* (2013.01); *G06Q 50/01* (2013.01)

(58) Field of Classification Search
CPC .......... H04L 29/06; H04L 29/08; H04N 7/15; H04N 7/14; G06Q 30/08; G06Q 20/12; G06F 16/955
USPC ............................... 348/14.01–14.16
See application file for complete search history.

(56) References Cited

U.S. PATENT DOCUMENTS

| | | | | |
|---|---|---|---|---|
| 2009/0115843 | A1* | 5/2009 | Sohmers | H04N 21/47815 348/61 |
| 2013/0083156 | A1* | 4/2013 | Forkner | H04N 7/152 348/14.08 |
| 2017/0353508 | A1* | 12/2017 | Yoakum | G06F 3/04817 |

* cited by examiner

*Primary Examiner* — Melur Ramakrishnaiah
(74) *Attorney, Agent, or Firm* — Tysver Beck Evans, PLLC

(57) ABSTRACT

A system and method are presented for the creation and management of live audio-visual streams between multiple parties. An organizing computer system requests a system server to establish a stream with a limited, preset number of slots. Other computer systems request to join the stream. Once the present number of slots is filled, a queue is established for waiting computer systems. Participating computer systems can be limited in their participation to a present time period, after which they are removed from the streams. Removal of one computer system from the stream opens a slot for another, which is filed from the queue of waiting computer systems. The queue can be sorted through a variety of means, including FIFO and auction.

20 Claims, 16 Drawing Sheets

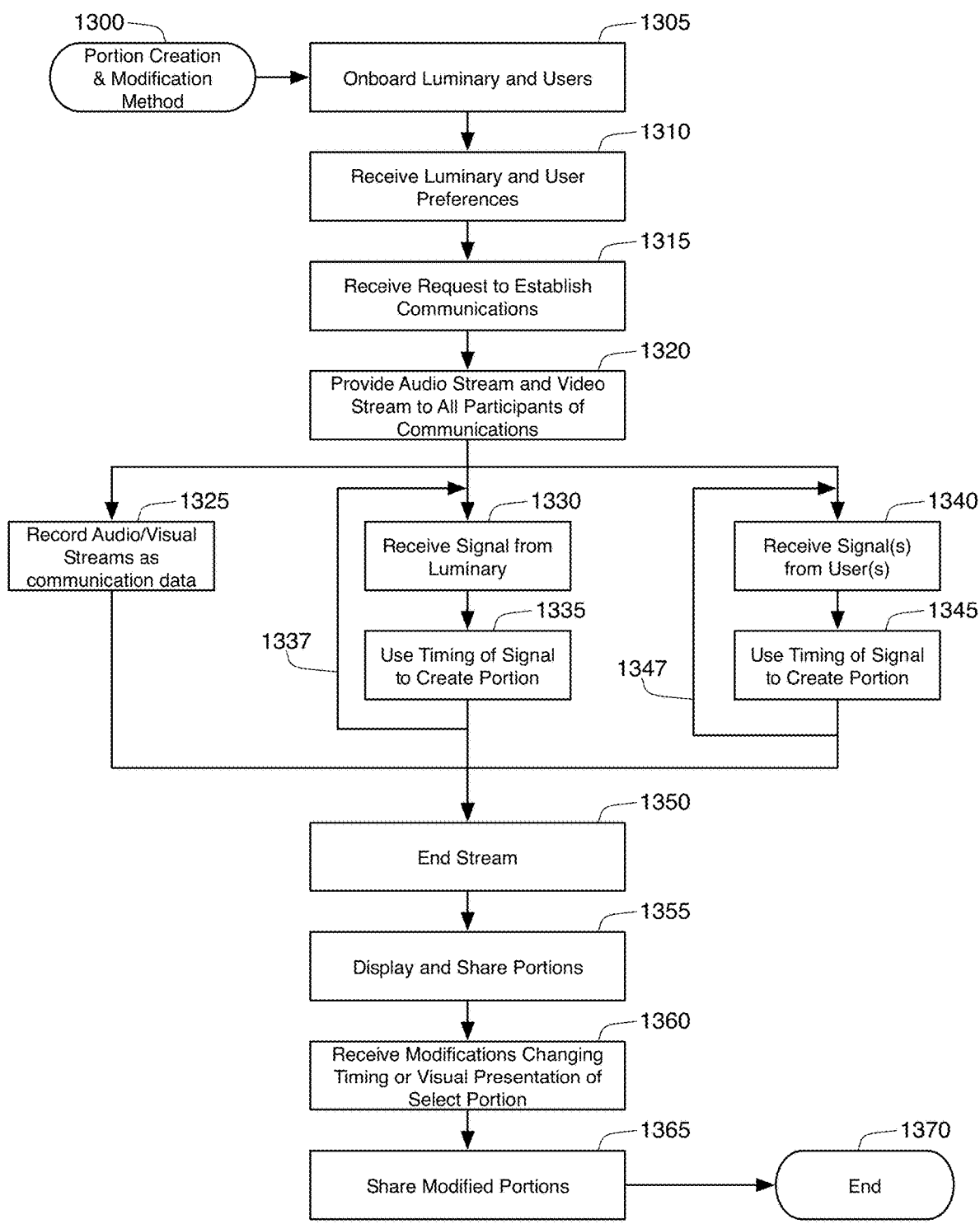

Figure 14
1400

Luminary Interface

Describe topics that you would be interested in discussing — 1410

[Preferred Topics] — 1412

Are there any topics that you would like to be off-limits during the communication? — 1420

☐ Relationships
☐ Money
☐ Other: _____
— 1422

Figure 15
1500

User Interface

You are requesting to schedule to an audio-visual streaming session with *Mary Jones*. Here are the details of that session.

Total: $75.00

Type: Personal, one-on-one

Date: August 20, 2022

Duration: 15 Minutes

Time: 8am to 8:15 am — 1510

Focus: Fantasy Sports

Topic Limits: — 1520
You may not discuss money or romantic relationships

☐ I Agree to Topic Limits — 1530

Figure 16
1600

Feedback

[■ REPORT] — 1610

How do you rate the quality of this communication? — 1620

☆ ☆ ☆ ☆ ☆

Were the participants on time? — 1630

[Yes] [No]

How was the quality of the communication? — 1640

[Very Clear] [Fuzzy Video]

[Unclear Audio]

Figure 17
1700

REPORT SESSION

Why are you reporting this session? — 1710

☐ Participant arrived late/left early

☐ Inappropriate behavior

☐ Failure to follow topic limits

Please leave additional comments: — 1720

[Comments]

☐ I want to be contacted by a representative — 1730

[Report] — 1740

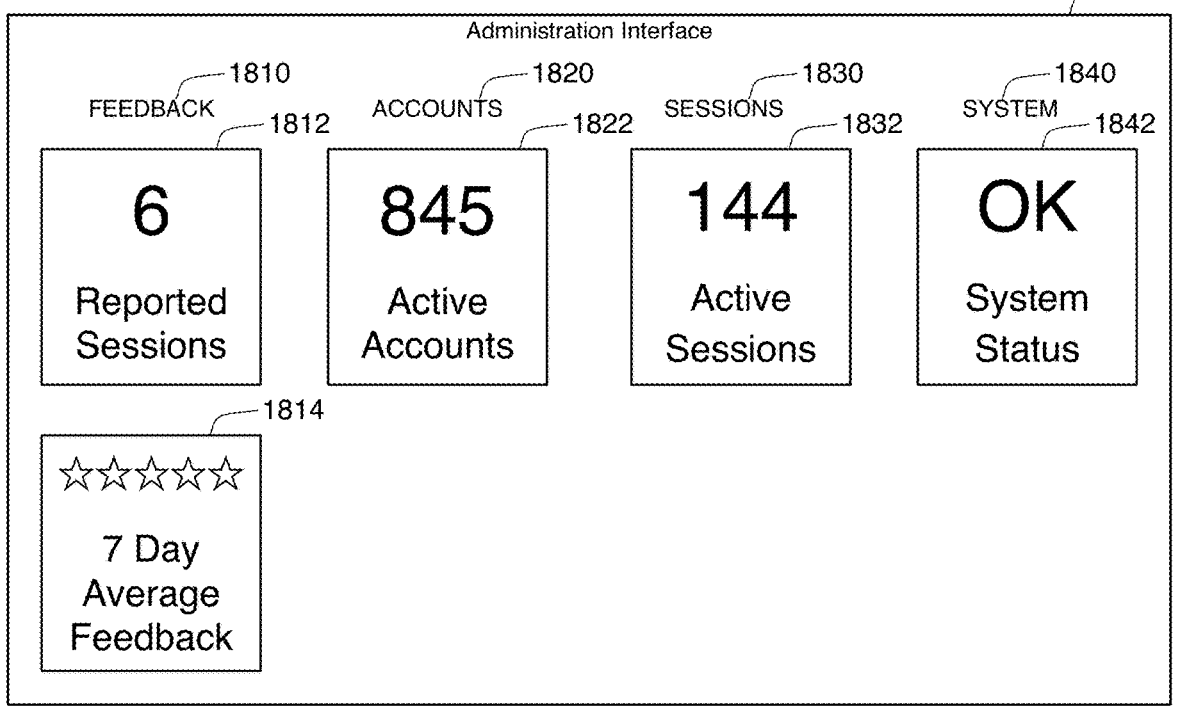
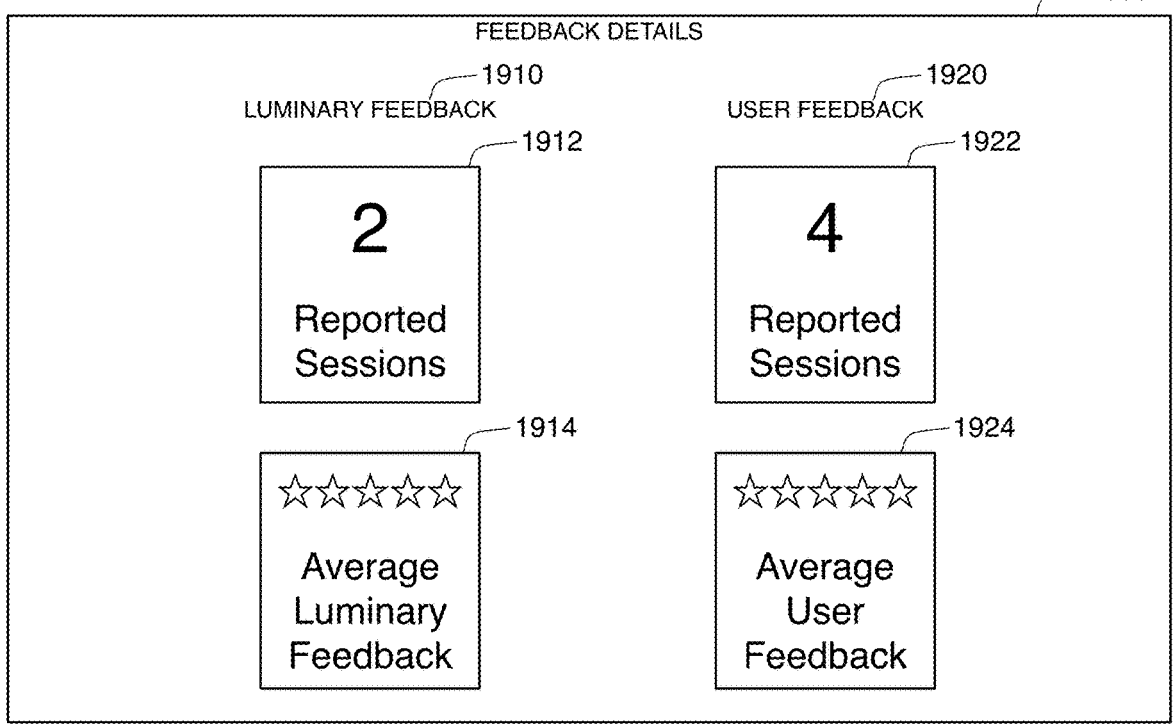

Figure 20

REPORTED SESSIONS

| Participant Name | Type | Date | Complaint | Status |
|---|---|---|---|---|
| Joe Smith | Luminary | Aug. 14, 2022 | Behavior | Resolved |
| Jill James | User | Aug. 18, 2022 | Left Early | Contacted |
| John Miller | User | Aug. 18, 2022 | Behavior | New |
| Mary Jones | Luminary | Aug. 20, 2022 | Topic Limit Violation | New |
| Luis Fernandez | User | Aug. 20, 2022 | Left Early | New |
| Mia Johnson | User | Aug. 20, 2022 | Behavior | New |

Figure 21

REPORT HANDLING

Mary Jones    Luminary    Aug. 20, 2022    Topic Limit Violation

[Contact]

| Session Time | Report Time | Comments | Request Contact? |
|---|---|---|---|
| 8/20/22 8:00-8:15 am EDT | 8/20/22 8:14 am | Repeatedly discussed income | No |

Off-Limit Topics for Mary Jones:
Income, relationships

Participant List with Start and Stop Times

[Review Recording]

[No Violation, Release Recording]

[User Violation, Pay Luminary]

[Luminary Violation, Refund User]

[Mark as Resolved]

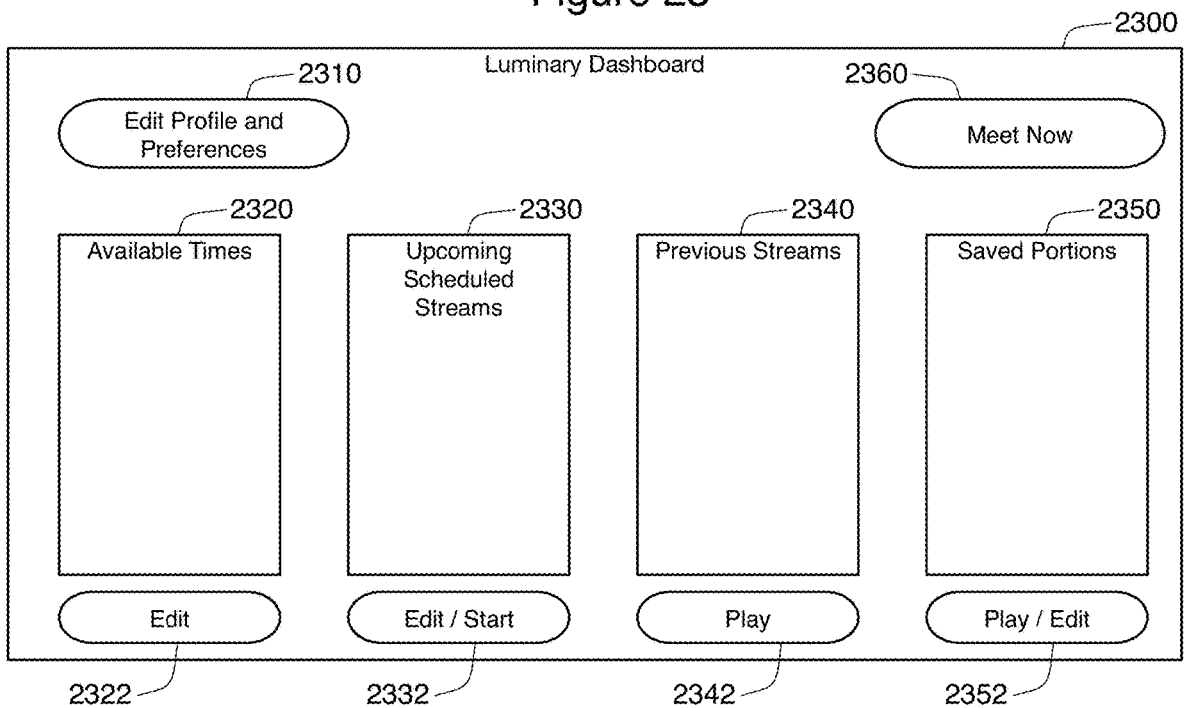
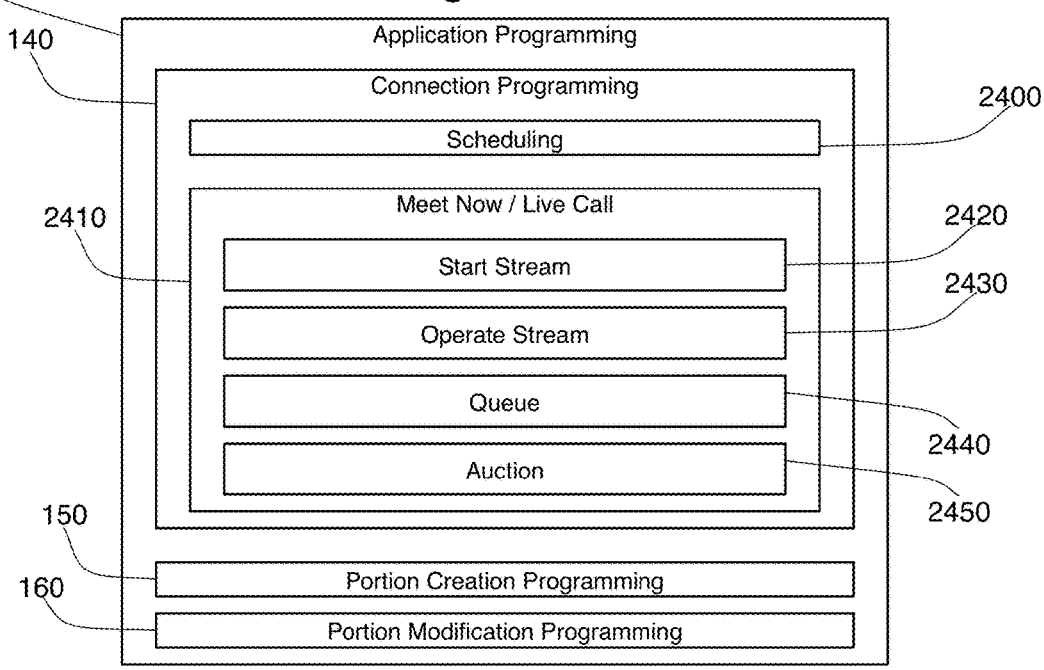

LIVE MULTIPARTY AUDIO-VISUAL COMMUNICATION LINKING SYSTEM AND METHOD

CROSS-REFERENCE TO RELATED CASES

This application claims the benefit of U.S. Provisional Patent Application No. 62/839,865, filed Apr. 29, 2019. This provisional application is hereby incorporated by reference in its entirety.

FIELD OF THE INVENTION

The present invention involves the field of audio-visual streaming communications. More particularly, the present invention relates to the creation of a live video stream with limited slots for participating computer systems, and an associated participating computer system queue.

BRIEF DESCRIPTION OF THE DRAWINGS

FIG. 13 is a flow chart showing a process of generating and modifying audio-visual portions of a multi-party video stream.

FIG. 14 is a computer interface screen for a luminary to input preference data include black-list topics.

FIG. 15 is a computer interface screen reminding a user of black-list topics.

FIG. 16 is a computer interface screen allowing feedback and reporting of communication streams.

FIG. 17 is a computer interface screen allowing input of reporting details.

FIG. 18 is a tiled computer interface screen for an administrative computer.

FIG. 19 is a tiled computer interface screen showing feedback data and reported sessions.

FIG. 20 is a computer interface screen showing a list of reported sessions.

FIG. 21 is a computer interface screen allowing one-touch review of recorded communications data and one-touch resolution of reports.

FIG. 23 is a computer interface screen showing a luminary dashboard layout and including a meet now button.

FIG. 24 is a schematic video of the application programming on the server system.

DETAILED DESCRIPTION

System 10

Figure 1:
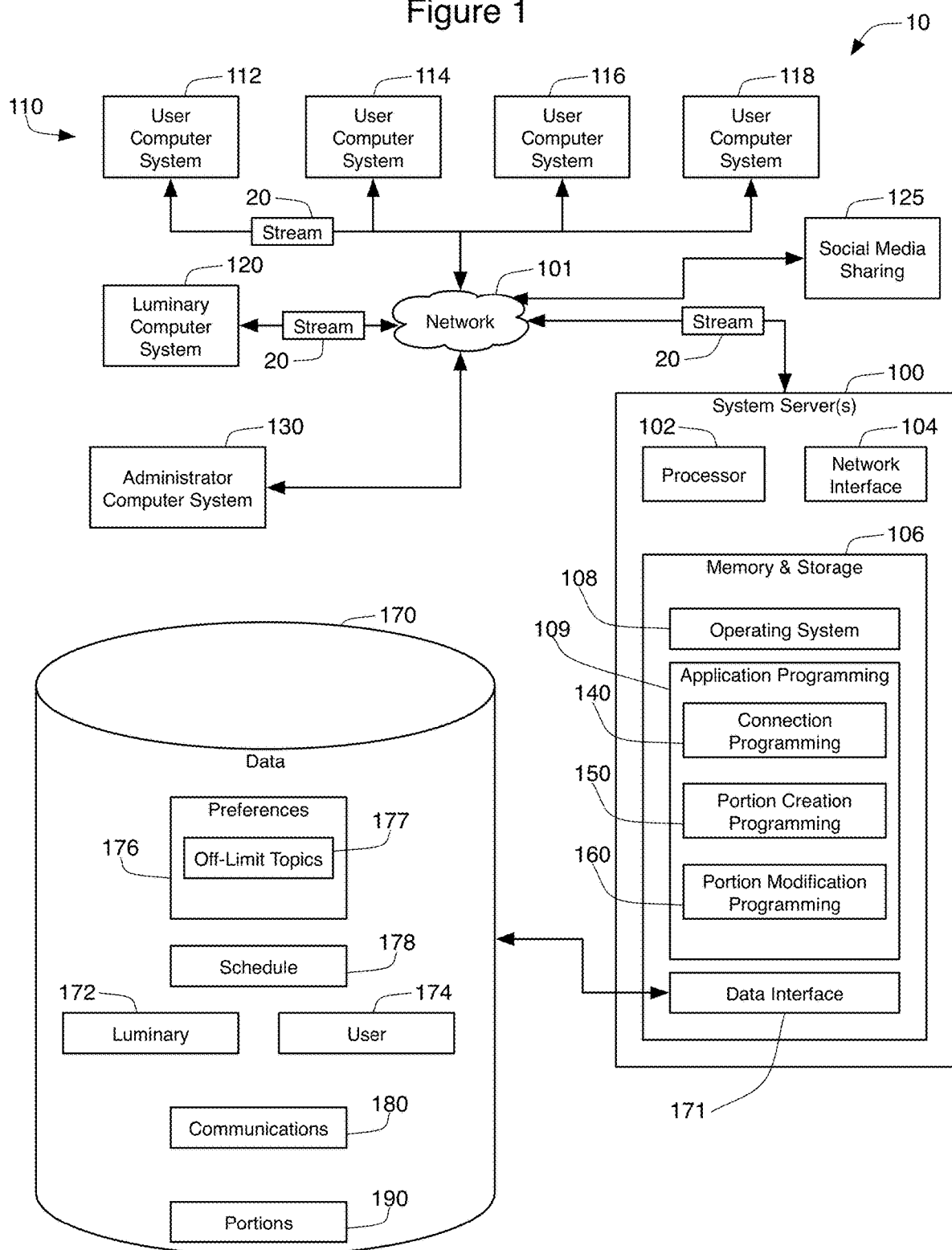
FIG. 1 is a schematic view of a system for providing a multi-party video stream and the creation of individualized portions.

FIG. 1 shows a system 10 for the creation of a multi-party video stream 20. The system 10 relies upon the presence of at least one system server 100. The server 100 communicates over a computer network 101 with one or more user computers systems 110 and a luminary computer system 120. More particularly, four user computer systems 110 are shown in FIG. 1, which are referenced using figure numbers 112, 114, 116, and 118. In an actual embodiment, many more user computer systems 110 would form part of system 10. Similarly, even though only a single luminary computer system 120 is shown, it is expected that an actual embodiment of system 10 will connect with a large plurality of luminary computer systems 120. Finally, although only a single device is shown as system server 100 in FIG. 1, it is well known to establish a plurality of server computer devices on a network 101 that operate together as a single server system 100. Thus, the use of a single computing device as the system server 100 is merely illustrative for describing the functionality of the present invention. In some embodiments, the operation of the system server 110 and the overall system 10 can be controlled through an administrative computer system 130.

Because all of the devices 100, 110, 120, 130 are computing devices, each of these devices 100, 110, 120, 130 includes a processor 102 for processing computer programming instructions. This is true even though FIG. 1 only shows processor 102 inside the system server 100. In most cases, the processor 102 is a CPU, such as the CPU devices created by Intel Corporation (Santa Clara, Calif.), Advanced Micro Devices, Inc (Santa Clara, Calif.), or a RISC processor produced according to the designs of Arm Holdings PLC (Cambridge, England). The computing devices 100, 110, 120, 130 will also have a network interface 104 that allows for communications with each other over network 101. When the network 101 is the Internet, the network interfaces 104 will be capable of communicating over a TCP/IP communications protocol. Other networks 101 are possible for use in the system 10.

The purpose of the system 10 is to generate a live video stream 20 between the luminary computer system 120 and at least one of the user computer systems 110. In at least one embodiment, the live video stream 20 exists between the luminary computer system 120 and multiple user computer systems 110, such as all four of the user computer systems 112, 114, 116, 118 shown in FIG. 1. The generated video stream 20 includes both visual and audio elements, and therefore can be considered an audio-visual stream 20. In one embodiment, the video stream 20 takes the form of a video conference stream. In a video conference stream 20, each of the various computer systems 110, 120 provide both audio and video data for the video stream 20. The system server 100 receives audio and video data from each of the participating computer systems 110, 120 and then generates a video stream 20 that combines the data it received in a manner that is useful and/or entertaining. The system server 100 generates this video stream 20 and shares it in real time with the various computer systems 110, 120 that are participating in the video stream 20.

In one embodiment, computer system 120 is operated by a luminary. A luminary is an individual of some fame or expertise such that users would be interested in communicating with the luminary. For example, the luminary may be a sports star, a movie star, a famous musician, a business leader, an academician, or some other celebrity. Using the luminary computer system 120, the luminary may communicate with the system server 100, input background information about themselves, and express a willingness to engage in multi-party video streams with a variety of users in exchange for compensation. Users on the user computers 110 can review information concerning various luminaries that have registered with the system server 100 and request a shared video stream 20 with a particular luminary. Users will generally pay consideration to participate in the stream 20 with the luminary.

In the description that follows, streams 20 are generally described as occurring between a single luminary computer system 120 and one or more user computer systems 110. Nonetheless, it is within the scope of the present invention to establish streams between multiple luminary computer systems 120 and one or more user computer systems 110. Any consideration generated could be shared by the participating luminary computer systems 120. Furthermore, and preferences associated with the luminary computer systems 120 could be aggregated to govern the generated stream 20. Although such configurations of the stream 20 are contemplated, the following discussion and examples will generally refer to a stream 20 involving a single luminary computer system 120 for ease in explaining and understanding the disclosed invention.

Each of the computing systems 100, 110, 120, 130 has a memory 106 containing programming and data that assists in the creation of these video streams. In FIG. 1, the memory 106 is shown only in the system server 100. The memory 106 generally takes the form of both temporary, random access memory (RAM) and more permanent storage such as magnetic disk storage, FLASH memory, or another non-transitory (also referred to as permanent) storage medium. The programming and data will be stored permanently on non-transitory storage devices and transferred into RAM when needed for processing or analysis. In all computing devices 100, 110, 120, 130 the memory 106 contains an operating system 108 responsible for the general operation of the computing devices 100, 110, 120, 130 and proper operation of the application programming 109 that is also stored in the memory 106.

In the user computer systems 110 and the luminary computer system 120, the application programming 109 can take the form of a simple browser program that receives and transmits web-based data with the system server 100. In this embodiment, the system server 100 is completely responsible for creating the user interface shown by the browsers on the connected computing systems 110, 120. In other embodiments, the connected computing systems 110, 120 run specialty application programming 109 that communicates over the network 101 with the system server 100. The specialty application programming 109 can include programming to create large portions of the user interface used by these computing systems 110, 120. The application programming on these devices 110, 120 submits to the system server 100 audio and visual information received from microphones and cameras on or connected to the devices 110, 120. The application programming 109 on the server 100 then generates the audio-visual stream 20 based on this data. The stream 20 is received by the application programming on the devices 110, 120, and then inserted into the user interface created by that programming.

In still other embodiments, one, several, or all of the user computer systems 110 and the luminary computer system 120 are mobile devices such as tablet computers or smart phones. These devices 110, 120 generally use ARM-based RISC processors 102, run mobile device operating systems 108, and utilize "apps" downloaded from an app store as their application programming 109. In these cases, the application programming 109 can still either take the form of a browser app or a specialty application app that is responsible in part for forming the user interface show by the devices 110, 120.

In the system server 100, the application programming 109 is divided into three main components 140, 150, 160. This division is illustrative only, as there is no requirement that the application programming 109 for the system server 100 be physically or even functionally separated into these three divisions 140, 150, 160. The first of these components is connection programming 140. Connection programming 140 is responsible for creating and operating the multi-party video stream 20. In particular, connection programming 140 determines which user computer systems 110 will be included with the luminary computer system 120 in the stream 20, ensures that all of the connected computers 110, 120 are transmitting audio and visual data to the system server 100, uses the received audio and visual data to create the multi-party video stream 20, and then transmits the multi-party video stream 20 to the connected user computers systems 110 and the luminary computer system 120. The connection programming 140 is also responsible for receiving inputs from the user interfaces provided on the connected devices 110, 120, and adjusting the content of the multi-party video stream 20 as appropriate. For example, in some embodiments, a user may alter the presentation of the video stream 20. One user may wish to see the visual of all of the participants of the multi-party video stream 20 simultaneously and at equal size, while another user may wish to see only the visual data provided by the participant that is currently speaking. These features can be provided by the connection programming 140, or by the connection programming 140 working in concert with specialty application programming on the user and luminary computer systems 110, 120. Furthermore, the connection programming 140 may be responsible for generating a stored, audio-video file containing the content of the entire multi-party video stream 20.

Creating Stored Portions

The portion creation programming 150 is responsible for receiving requests for the creation of stored portions of the audio-visual stream 20. To perform this function, the portion creation programming 150 first receives a signal from either the luminary computer system 120 or one of the user computer systems 110. This signal indicates that a participant would like to store the current portion of the stream 20 for later retrieval and sharing. The signal may take the form of a "bookmark" signal, effectively allowing a participant to press a user interface button in order to store an interesting portion of the stream 20 that is occurring at that moment. Although this can be referred to as a bookmark, and the user interface can suggest that the user is requesting that a bookmark be created, the actually created portion is more than a simple bookmark of a location with the stream 20. Instead, the portion is a recorded sub-section of the material that constitutes the stream. In one embodiment, the portion creation programming 150 notes the timing of the received signal and ensures that the audio and video components of the stream 20 surrounding this temporal location are stored for later retrieval. In other embodiments, the components that make up the stream 20 are always stored so that the creation of the portion can occur based on these stored components.

The portions created by programming 150 can be reviewed by the requesting luminary computer system 120 or user computer system 110 after the stream 20 is complete. These portions may be considered private to the requesting computer system 110, 120, in that only the requesting computer system 110, 120 may access that portion. In some embodiments, programming 150 further provides linkages to a social media sharing server 125. A user or luminary can provide to the system server 100 their account information for social media site 125 and then request that the portion creation programming 150 share the created portion on their account on site 125.

Portion modification programming 160 is provides the requesting luminary computer system 120 or user computer system 110 the ability to modify their stored portions. The process for modifying a stored portion is described in further detail below.

The last of the programming stored in memory 106 is the data interface 171. This interface programming 171 allows the system server 100 and the application programming 109 to access, manage, modify, and create stored data 170. The stored data 170 can be stored on the same computer device as the system server 100. Alternatively, the data 170 can be stored on attached storage, or on a storage area network on which the system server(s) 100 reside. In still further embodiments, the data 170 is managed by a separate computer system that is accessible to the system server 100, such as over a local area network, a wide area network, or some type of direct communication. The data 170 itself can be stored in a structured database in the form of objects in an object-oriented database or within tables in a relational database. In still further embodiments, the data 170 is organized in a data store utilizing a known format such as key value pairs or tuples. In the present description, the data 170 will be described as being divided into separate data entities 172-190 which may take the form of a table or object. This description is illustrative of the type of data being stored and the relationship between the data. Unless otherwise specifically stated in the claims, there is no requirement, that the data 170 be separated into the specific data entities 172-190 described herein.

Figure 2:
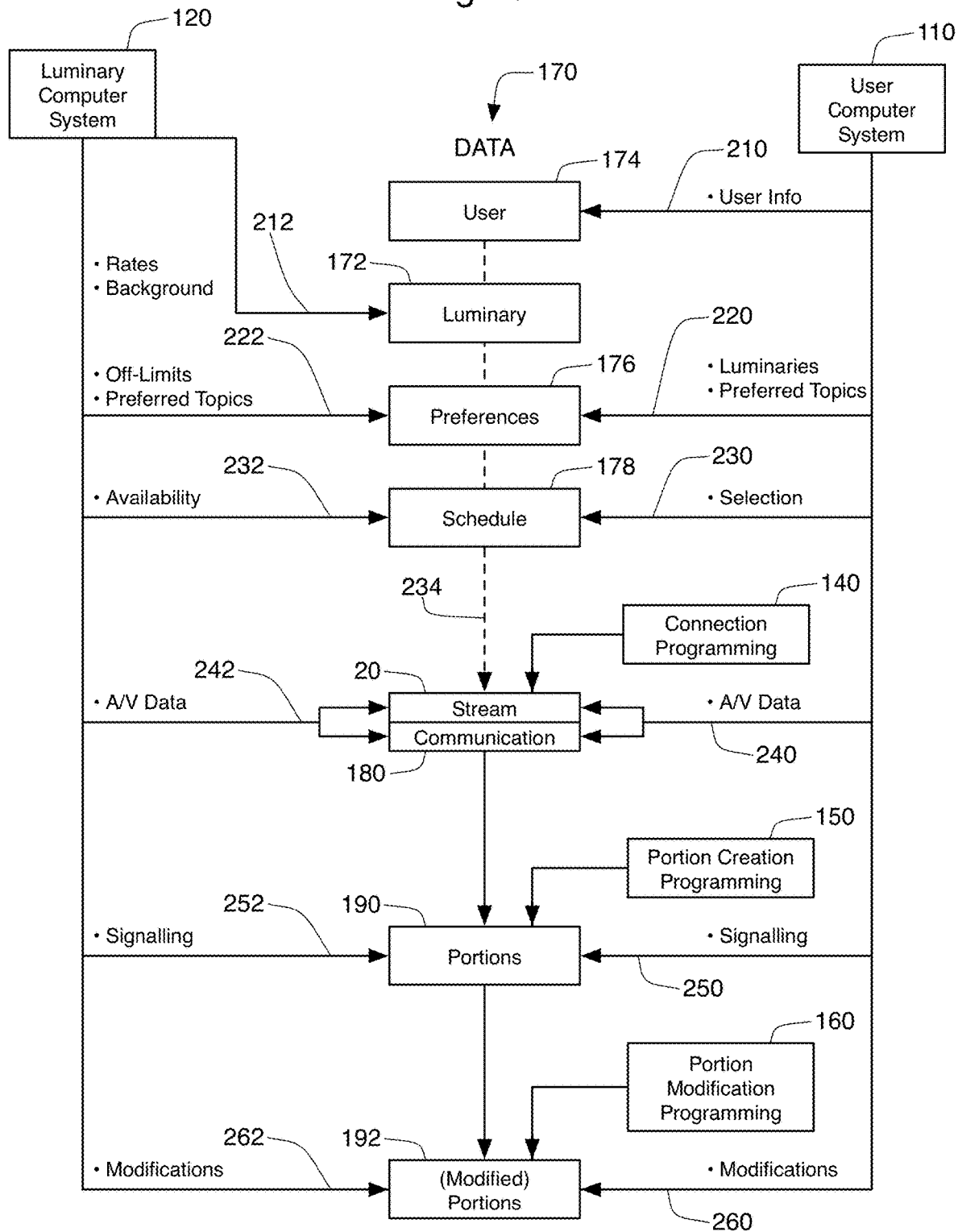
FIG. 2 is a schematic view of the use of the data from FIG. 1 for the generation and modification of portions.

FIG. 2 shows these same data entities 172-190 along with the signals and data elements that are stored in these entities. The luminary entity 172 and the user entity 174 store data associated with the participant using the luminary computer system 120 and the participant using the user computer system 110, respectively. In particular, information about the user 210 can be received from the user computer system 110 during the on-boarding process of the user creating an account for use of the system 10. This user information 210 is then stored in user data entity 174. Similarly, the luminary computer system 120 provides luminary information 212 for data entity 172. This can include background information about the luminary that will remind users of the luminary's accomplishments. This data 212 can also include rate information that the luminary specifies that they wish to charge users to engagement in a live audio-video stream 20.

Data 170 also includes a separate preferences data entity 176 that stores the preferences of the various users and luminaries. Users may indicate a preference 220 for particular luminaries, or particular types of luminaries (opera stars, players from particular sports teams, etc.), as well as preferred topics of discussion (such as writing tips provided by author luminaries, or fantasy sports tips provided by sports stars). Luminaries can also provide preference data 222 concerning preferred topics of discussion. In some embodiments, the luminaries can provide preferences 222 concerning off-limit or black-listed topics (such as romantic relationships or money), which is shown as preference 177 in FIG. 1. Establishing off-limit topics 177 is important to ensure participation from the luminaries, and violations of these restrictions must be managed carefully. Interfaces and processes for handling violations of these types of restrictions are described in more detail below.

In order to link the user computers 110 with the luminary computer system 120, scheduling data 178 must also be maintained and shared. The luminary computer systems 120 provide availability data 232 that can be shared with user computer systems 110, while a user computer system 110 provides selection information 230 in order to select one of the identified times in the availability data 232 for the stream 20 to occur.

Figure 3:
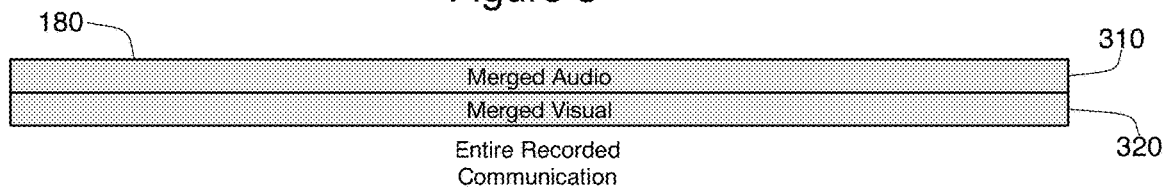
FIG. 3 is a schematic view of a recorded communication.

When the scheduled stream 20 goes live, the system server 100 receives audio and visual data 240 from each of the user computer systems 110 participating in the stream 20 and also receives similar data 242 from the luminary computer system 120. This data 240, 242 is used by the connection programming 140 to create the audio-visual stream 20 that is shared with the participating computing devices 110, 120. In addition, some embodiments of the server system 100 also use this same data 240, 242 and store the data as a single communication data item 180. This communication data entity 180 stores the entire content of the audio-visual stream 20. This content is stored as an audio-visual file using a standard video codec (such as H.264) and a standard audio codec (such as AAC) in a container file (such as MP4). In some embodiments, as shown in FIG. 3, the audio-visual file 180 contains a single audio element 310 and a single visual element 320 that combines the audio-visual data 240, 242 received from the participating computing devices 110, 120 into a single audio-visual (or video) file 180. In this embodiment, the separate visual elements from the received data 240, 242 can be combined using a standard merging process, such as by presenting each visual element (the faces of the participants) in equally sized windows. Alternatively, the merged visuals 320 may emphasize the currently speaking participant in a larger window than the data received from non-speaking participants.

In other embodiments, all of the video data 240, 242 received from the participating computer devices 110, 120 are separately stored as part of the communications data entity 180, so that they can be recombined as desired by the participants at a later time. The audio may still be formed as a single, merged "track" of audio data, but separate visual "tracks" may separately store the visual data received from each of the participating computer systems 110, 120.

During the stream 20, the portion creation programming 150 monitors inputs from the user interfaces created by the user computer system 110 and the luminary computer system 120 for a signal 250, 252 indicating a desire to create a portion 190 of the video stream 20. These signals 250, 252 and the creation of the portion 190 are shown in more detail in FIGS. 4, 5, and 6.

Figure 4:
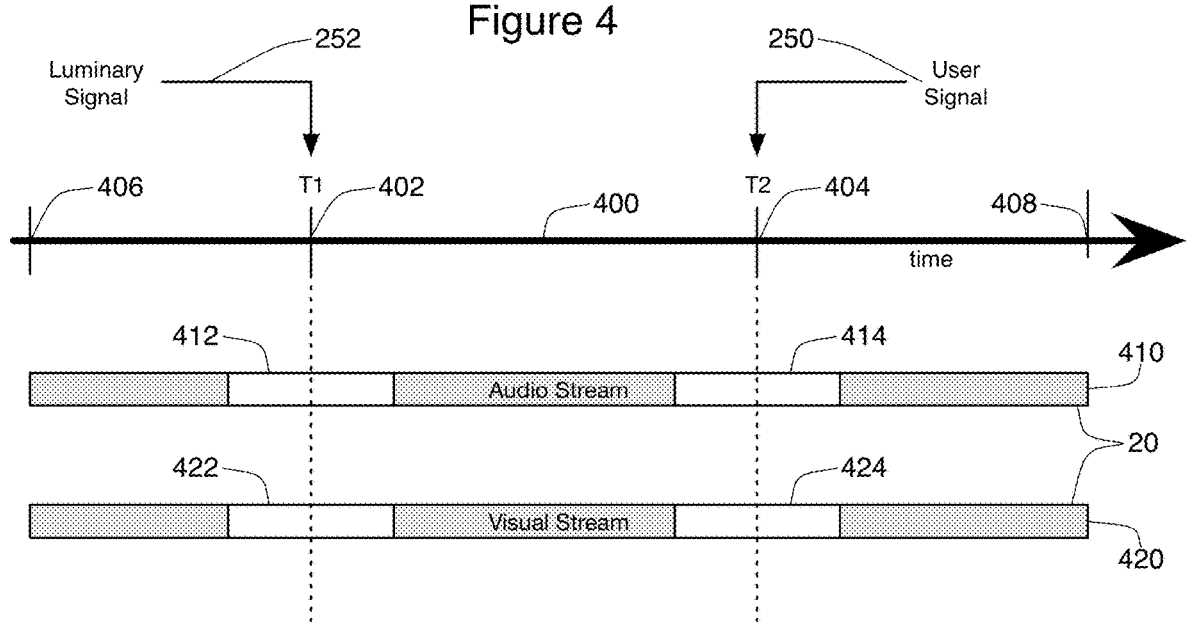
FIG. 4 is a schematic view of a timeline, audio stream, video stream, and two portioning signals.

FIG. 4 shows a timeline 400 in which time passes from left to right. Time T1 402 occurs to the left of time T2 404 on the timeline 400, and therefore time T1 402 occurs before time 404. At time T1 402, the system server 100 receives from the luminary computer 120 a signal 252 indicating a desire to save a portion 190 of the audio-visual stream 20. The audio-visual stream 20 in this embodiment consists of an audio stream 410 and a single visual stream 420. Remembering that the luminary computer system 120 in at least one embodiment presents to the participant using that computer system 120 the ability to alter the visual presentation of the stream 20 so as to emphasize and change the sizes of different video sources provided to the stream 20. For instance, the visual presentation of the stream 20 may change to present only the currently speaking participant of the video stream 20 on the entire visual interface. Alternatively, all participants in the stream 20 may be shown at different locations on the presented visual interface at equal sizes. Consequently, the single visual stream 420 of FIG. 4 may be the video portion of the stream 20 currently being presented on the luminary computer system 120. Alternatively, the single visual stream 420 of FIG. 4 may be an aggregate visual stream 420 created by the system server 100 specifically for the purposes of creating luminary portions 190. In this alternative, each participant can alter their visual presentation as they desire during the stream 20, but all stored portions 190 will use the aggregate visual stream 420 created by the system server 100 for this purpose.

Figure 5:
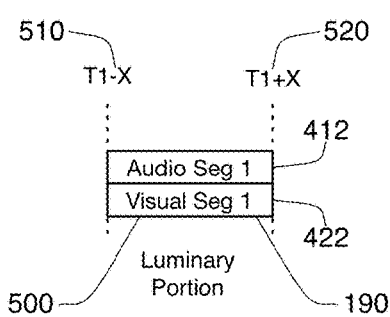
FIG. 5 is a schematic view of a first audio-visual portion.

At time T1 402, the portion creation programming 150 of the system server 100 receives the luminary signal 252 indicating a desire to save a portion 190 (aka the bookmark signal). When the signal 252 is received, portion creation programming 150 identifies a portion 412 of the audio stream 410 and a portion 422 of the visual stream 420 for use in creation the saved portion 190 of the stream 20. The specific portion 500 created as a result of signal 252 is shown in FIG. 5. As can be seen, the portion 500 created for the luminary computer system 120 consists of the audio segment 412 ("Audio Seg 1") and the visual segment 422 ("Visual Seg 1") combined into a single video file 500. Each of these segments 412, 422 are created based on the time T1 402 at which the luminary signal 252 is received. In one embodiment, the beginning of each segment occurs at a predetermined amount of time (X) before T1 (time 510), while the end of each segment 412, 414 occurs at the same predetermined time (X) after T1 (time 520). In some embodiments, X is 15 seconds. In other embodiments X is longer than 15 seconds (such as 30 seconds) or is shorter than 15 seconds. In yet other embodiments, the predetermined time used for times 510, 520 differs, such that the beginning time 510 is further or closer to the signal time T1 402 than the ending time 520.

As can be seen by the white areas representing segments 412, 422 in FIG. 4, the beginning time 510 of portion 500 occurs after time 406 when the entire stream 20 starts, while ending time 520 occurs before time 408 when the stream 20 finishes. In other words, portion 500 does not extend either to the starting time 406 or the finishing time 408 of the stream 20.

Figure 6:
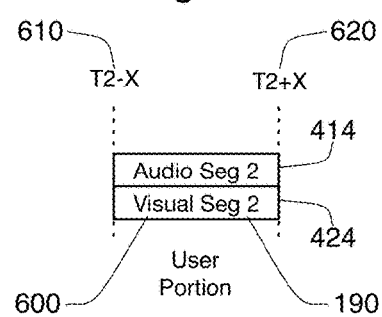
FIG. 6 is a schematic view of a second audio-visual portion.

At time T2 404, the portion creation programming 150 receives the user signal 250 from a user computer system 110. This triggers the programming 150 to create a second portion 190, namely the user portion 600 shown in FIG. 6. As shown in FIGS. 4 and 6, this portion 600 consists of Audio Seg 2 414 and Visual Seg 2 424 combined together into a video file. As was the case above, each of these segments 414, 424 may extend from a time that is the predetermined time X before T2 (time 610) until a time that is the predetermined time X after T2 (time 620). The two created portions 500, 600 are stored in the database 170 as portions 190.

This method for creating portions 190 allows a single action (transmitting signals 250, 252) to define portions 190 with a set beginning and ending time that are different from (but overlap) the time at which the actions (and transmitted signals) occur. In other words, the transmission of these signals 250, 252 is the only signal that needs to be received from the computer system 110, 120 in order to create a portion 190. No other signals related to the timing (when the portion 190 is taken from inside the stream 20) or duration (the time between the beginning and ending of the portion 190) is required. This is important because the signals 250, 252 are generated during the time that the stream 20 is being transmitted and received. Requiring multiple signals (turn on recording and turn off recording, etc.) would increase the amount of effort and concentration required by the participants, which would distract from the enjoyment of the stream 20 itself.

Luminaries and users can review the portions 190 that they create and share them on a social media sharing site 125 without any additional editing or definition. Thus, if a moment is occurring in the video stream 20 that a participant wants to remember, the participant simply presses a button on their respective user interface that transmits signal 250, 252, and the portion creation programming 150 will store a portion 190 of the stream 20 that contains that memorable moment in data 170 for later review and sharing.

Figure 7:
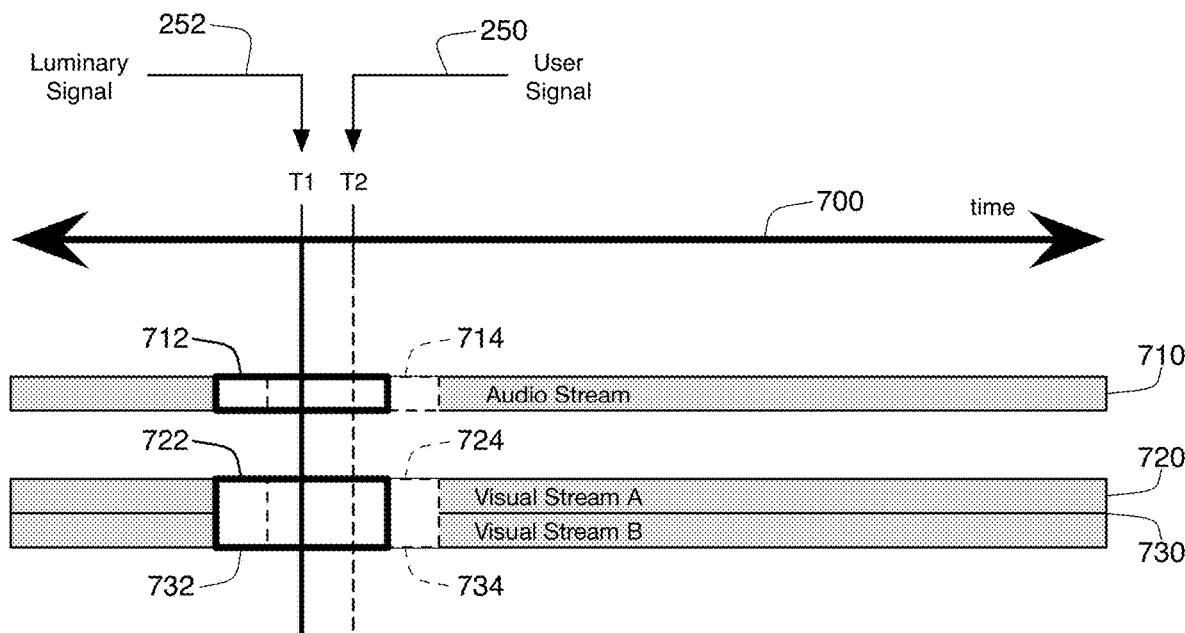
FIG. 7 is a schematic view of a timeline, audio stream, multiple video streams, and overlapping portioning signals.

FIG. 7 shows another embodiment of portion creation programming 150 that is able to store date from multiple visual streams. In particular, FIG. 7 shows that a portion 190 can be created storing information from an audio stream 710 and two visual streams, namely visual stream A 720 and visual stream B 730. These visual streams 720, 730 may originate at two different computing systems, such as luminary computer 120 and user computer 112. In the context of a multi-party video conferencing stream 20, each visual stream 720, 730 may contain the image of the face of a different participant in that stream 20. It is to be expected that more than two visual streams 720, 730 could be included. For instance, if five user computers 110 and one luminary 120 were participating in the stream 20, there would be six different visual streams included.

Figure 8:
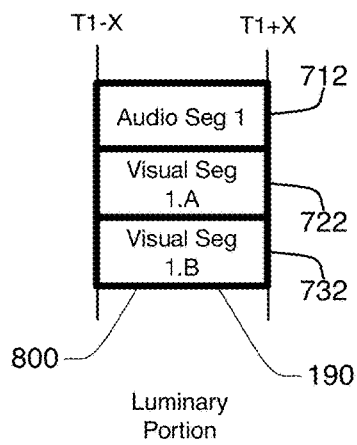
FIG. 8 is a schematic view of a third audio-visual portion.
Figure 9:
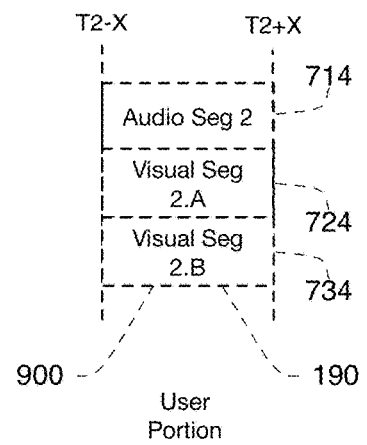
FIG. 9 is a schematic view of a fourth audio-visual portion.

In the context of FIG. 7, a luminary signal 252 is received at time T1 on timeline 700, while a user signal 250 is received at time T2. The portions 190 created by each of these signals 252, 250 will contain multiple visual segments. Specifically, one visual segment from each included visual stream 720, 730 will be included in each created portion 190. Thus, as shown in FIG. 8, the luminary portion 800 includes audio segment 1 712 from the audio stream 710, visual segment 1.A 722 from visual stream A 720, and visual segment 1.B 732 from visual stream B 730. As shown in FIG. 8, these segments 712, 722, 732 extend from a predetermined time X before time T1 (T1−X) to the predetermined time after time T1 (T1+X). Similarly, the created user portion 900 shown in FIG. 9 contains audio segment 2 714, visual segment 2.A 724 from visual stream A 720, and visual segment 2.B 734 from visual stream B 730. These segments 714, 724, 734 are selected using T2 (the time of receipt of the user signal 250) and predetermined time X, extending from T2−X to T2+X. As shown in FIG. 7, it is possible for the two portions 800, 900 to overlap on the timeline 700, such that the beginning of user portion 900 occurs in between the beginning of luminary portion 800 and the end of luminary portion 800. The portions 800, 900 are stored as two separate portions 190 in the data 170. This allows the portions 800, 900 to be independent, so that any modifications made to one portion 800 will not impact the other portion 900, and vice versa. In at least one embodiment, separate video files are used to store these two portions 800, 900 in the data 170.

Modifications to Stored Portions

Returning to FIG. 2, it is seen that modifications can be made to a portion 190 using the portion modification programming 160. Modifications may be made by a participant only to the participant's own portions 190, so the portion 190 being modified must be first requested by the participant's computer 110, 120 during the stream. As explained above, once the portions 190 are created, they are stored in data 170. When the stream 20 has ended, the participants' computer systems 110, 120 are informed of any portions 190 that were created for them during the stream 20. In some embodiments, the portions 190 are not created by the server 100 until after termination of the stream 20. Once the portions 190 are created, user interfaces provided to those computers 110, 120 will allow the playback of a portion 190, the sharing of the portion 190 over social media sharing 125, or the modification of the portion 190. If the participant wishes to modify the portion 190, the portion modification programming 160 will receive modification instructions 260 from the user computer system 110 or similar instructions 262 from the luminary computer system 120. The modification programming 160 will then apply the requested modifications and create a modified version of the portion 192. The modified portion 192 is then stored with other portions 190 in the data 170.

As shown in FIG. 8, luminary portion 800 contains multiple visual segments 722, 732. In these types of embodiments, the requested modification to the portion 800 may reflect a user's choice as to how these different visual segments 722, 732 are integrated together when the portion 800 is either presented to the luminary computer 120 or shared to others (such as over the social media sharing site 125). For instance, the luminary may wish to have only the visual of the person currently speaking being presented in the visual playback of the portion 800, meaning that the displayed visuals will switch between visual segment 1.A 722 and visual segment 1B 732 depending on which person is speaking. Alternatively, even if there are more than two visual segments 722, 732 in the portion 800, the luminary may wish to only have themselves and one other person visually presented as part of the portion 800. This control of the visual presentation of the portion 800 can be saved as a modified version of portion 800 using portion modification programming 160 so that all future playbacks and sharing of the portion 800 will reflect the luminary's edits to this visual presentation.

In some embodiments, the portions 800, 900 are downloaded and shared as video files such as the MP4 containers discussed above. It is possible to store separate video tracks inside a video container. However, very few video players are actually designed to access these multiple video tracks or to switch seamlessly between these tracks. As a result, in most circumstances, it is preferable to store the multiple visual segments 722, 724, 732, 734 at the server 100. The user interfaces provided to the user computer system 110 and the luminary computer system 120 will then allow the participant to manipulate the multiple visual segments 722, 724, 732, 734 in order to create a preferred visual presentation. Once the preferred presentation is identified, the server 100 will then generate the portion 190 as a video file with a single visual track based upon the participant's modification instructions. In this type of embodiment, the originally creation portion 190 generated by the system server 100 after receiving signal 250 or 252 will also contain a single visual track, with the visual presentation being that which the participant was viewing during the stream 20, or some other presentation format that merges the different visual segments 722, 724, 732, 734 according to default or participant preference settings 176.

Figure 10:
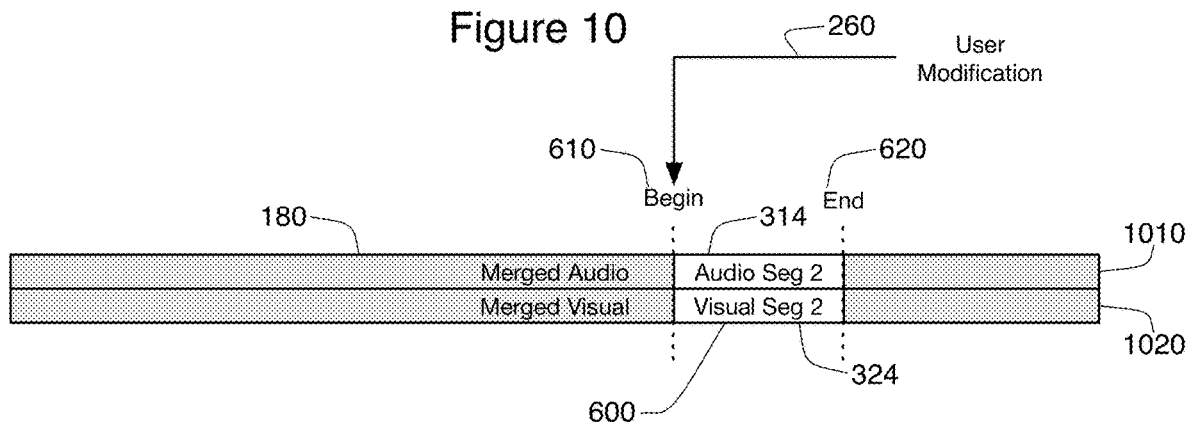
FIG. 10 is a schematic view illustrating the modification of the second audio-visual portion of FIG. 6.
Figure 11:
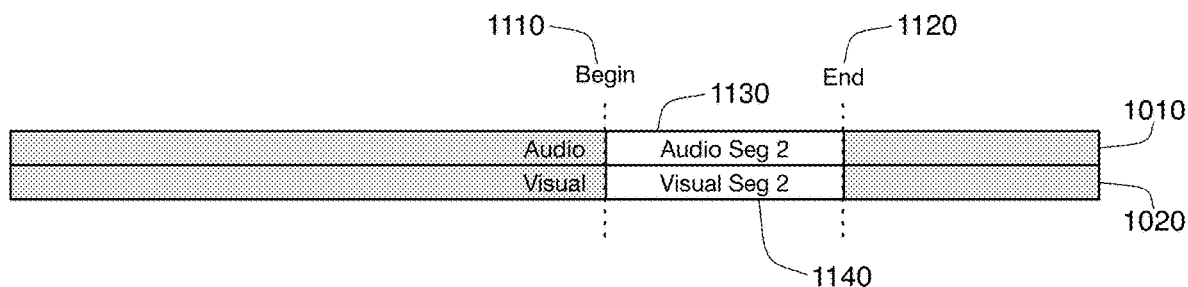
FIG. 11 is a schematic view of a modified second audio-visual portion in the context of the recorded communication of FIG. 3.
Figure 12:
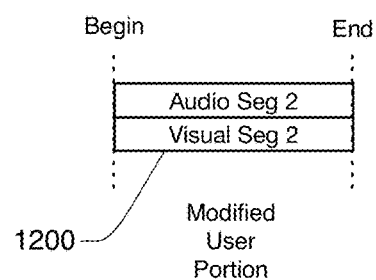
FIG. 12 is a schematic view of the modified second audio-visual portion.

FIG. 10 shows a different type of portion modification. In this case, a user modification signal 260 is being received to alter user portion 600. As shown in FIG. 6, user portion 600 originally extends from time T2−X 610 to time T2+X 620 because the request signal 250 was received at time T2 404. After the stream 20 is terminated, the user is able to change the beginning 610 and ending 620 times by submitting modification signal 260. The timeframe of the portion 600 can be changed because of the stored communication data 180 described above in connection with FIG. 3. To the extent the user wishes to move the beginning time before T2−X 610 or the ending time to after time T2+X, the necessary audio and video material can be acquired from the merged audio and visual components 1010, 1020 of the stored communication 180. As shown in FIG. 11, the user is able to modify portion so that it extends from new begin time 1110 until new end time 1120. By changing the beginning and ending times, a new audio segment 2 1130 and new visual segment 2 1140 are created. Together, these two segments 1130, 1140 create a modified user portion 1200 as shown in FIG. 12. Modifications of the begin and end times of a portion 190 can also be applied to embodiments where the portions contain multiple visual segments (such as portions 800, 900), as long as the stored communications file 180 also contains separate visual tracks from each of the participants.

As is suggested by FIGS. 10, 11, 12, some embodiments of system 10 may simply store the beginning 1110 and ending times 1120 of any segment 1200 and extract the necessary audio and visual data from the stored data 1010, 1020 in the whole stored communication data 180. When the participant requests the portion 1200 for sharing or playback, such an embodiment can simply create a new video file based on the data in the stored communication data 180 using the retained beginning time 1110 and ending time 1120. Other embodiments create and store the audio and visual contents of each portion 190 separately from the content of the stored communication 180. In particular, the portion 190 may be stored as a single audio-visual file encoded using a video codec, with each portion 190 being saved as a file separate from all other portions. The use of separate files speeds processing of viewing and sharing requests, as the stored video file that contains the stored portion 190 need only be accessed and then be immediately available to be played/shared/streamed/downloaded, as requested by the user or luminary computers 110, 120.

Method

FIG. 13 is a flowchart showing a method 1300 for creating and sharing portions 190 in a multi-party audio-visual stream 20. The method begins at step 1305, in which luminary users on luminary computers 120 and users on user computers 110 are onboarded into the system 10. In this process, the luminaries and users establish accounts, and then provide user info 210 and rates and background info 212 into the system database 170. Preference data 220, 222 is then received and stored as data 176 in step 1310.

At step 1315, the connection programming 140 receives a request from the user computers 110 and/or the luminary computer 120 to establish the audio-visual stream 20 between a plurality of participants. The connection programming 140 establishes this connection by interacting with application programming on the participant computers 110, 120. The connection programming 140 then receives audio and visual data 240, 242 from the participant computers 110, 120 and creates the multi-party stream 20 at step 1320.

At this point, multiple processes can occur at once. At step 1325, the connection programming 140 records the audio and visual data 240, 242 that makes up the stream 20 as the communications data 180. As explained above, this can comprise storing the different data sources separately 240, 242, or can comprise creating a single video file containing some combination or aggregation of the received audio and visual data 240, 242.

At step 1330, the portion creation programming 150 can receive signal 252 from the luminary computer 120 indicating a desire to store a portion of the stream 20 for later review, sharing, and editing. The portion creation programming 150 then, at step 1335, creations the portion 190 based on the timing of the received signal 252. As explained above, one embodiment uses a predefined time period X, and starts the portion 190 at the received time minus X and ends the portion 190 at the received time plus X. Arrow 1337 indicates that the luminary computer 120 is able to submit multiple signals 252 in order to create multiple portions 190 in the same stream 20. Simultaneously, one or more of the user computers 110 can submit signals 250 at step 1340. These signals 250 also cause the portion creation programming 150 to create portions 190 for the user computers 110 at step 1345 based on the timing of these signals 250. At arrow 1347, it is clarified that multiple portions 190 can be created for each user computer 110, as well as separate portions 190 for the separate user computers 110 that are participating in the stream 20.

At step 1350, the connection programming 140 ends the stream 20. At this point, the system server 100 displays to each computer 110, 120 that participated in the stream 20 a list of the portions 190 that were created for that computer 110, 120. In some embodiments, the system server 100 also provides an opportunity for the participant to download the entire saved copy of the communication 180 in addition to presenting the bookmarks.

At step 1355, the users of these computers 110, 120 can display their saved portions 190 and can share the portions with other user computers 110, with the social media sharing site 125, or through other techniques. These other techniques might include downloading a video file containing the portion 190 or copying and sharing a URL link to the location of the portion 190 on a website maintained by the system server 100. When followed, this link can cause the system server 100 to present the linked-to stored portion 190 to the browser that presented the server 100 with the URL link.

At step 1360, either a user computer 110 or the luminary computer 120 can send modification instructions 260, 262, respectively to the portion modification programming 160. As explained above, the participants can amend one of their portions 190 by changing the beginning or ending time for the portion 190. To the extent they wish to extend the portion 190 either before the beginning or beyond the end, audio and video data from the stored communication data 180 can be utilized. Alternatively, or in addition, the participant may wish to change the visual presentation of the portion 190. In the context of a multi-party video conference stream 20, the change to the visual presentation may change the emphasis or size of the various video components provided by the different computers 110, 120 during the stream. The modified portions 192 can then be shared at step 1365 in the same manner as the original portions 190 were shared at step 1360. The method then ends at step 1370.

Note the minor variations in method 1300 are possible. For example, an embodiment might allow a participant to create a new bookmark even after the stream 20 has ended at step 1350. This could be provided when the user selects to review the entire, saved communication 180. As part of playing back the communication 180 to the participant, an interface button could be provided to create a new portion 190 based on the currently being viewed portion of the communication 180. The created portion 190 could then be reviewed, downloaded, shared, and modified in the same manner as the portions 190 created during the stream 20.

User Interfaces for Content Monitoring and Quarantine

In some embodiments, one or more participants can impose content restrictions on the video stream 20. In the case of multiple user computers 110 being operated by users that pay compensation to participate in stream 20 with a luminary using luminary computer system 120, it is usually the luminary computer system 120 that imposes the content restriction. In order for the luminary to agree to participate in the stream 20, the luminary will desire some protection that certain topics will remain off-limits. Furthermore, to the extent these topics are broached, the luminary will desire the ability to prevent the release of any saved content related to a stream 20 where these topics were raised.

To accomplish this, the system 10 utilizes the participant and administrative user interfaces set forth in FIGS. 14-21, and the method 2200 discussed in connection with the flow chart of FIG. 22. These user interfaces provide the ability to control the content of the video stream 20 and prevent the release of any content that violates the expectations of the participants. Other approaches do not provide the efficacy of the interfaces presented here, particularly when these user interfaces are utilized in connection with method 2200.

In order to control the content of the stream, the system 10 must first allow a participant such as the luminary to store preference data 176 indicating their content desires. FIG. 14 shows a user interface 1400 that is generated by the system 10 for the luminary computer system 120. When the user interface 1400 is provided through the World Wide Web, application programming 109 on the luminary computer system 120 will take the form of a browser, while the interface 1400 will be generated by a web server operating as part of the application programming 109 on the system server 100. In embodiments where the luminary computer system 120 operates a specialty application or app, the interface 1400 may be created through this specialty app running on the luminary computer system 120, with data being shared between this specialty app and the system server 100 over the network 101. In FIG. 14, the interface 1400 is shown as an interface provided to a mobile device such as a smart phone 120. In other embodiments, the dimensions of the interface can be altered to appear as a landscape interface more appropriate for a computer screen. The actual dimensions of the interface 1400 is relatively unimportant, which is also true of the user interfaces shown in FIGS. 14-21.

Interface 1400 is a preferences interface that includes a prompt 1410 to describe topics that the luminary may prefer to discuss. A general text box 1412 is provided in the interface 1400 for the luminary to enter a list of, or a provide description of, the conversation topics that are preferred. More importantly, the interface 1400 provides the ability to define off-limits topics 177 (sometimes referred to as a blacklist of forbidden topics). Prompt 1420 encourages the luminary to consider those topics 177. Entry area 1422 includes the ability to create a list of topics, with some topics immediately presented in the form of a check list. In entry area 1422, both relationships and money are suggested as possible off-limit topics, with the ability for the luminary to manually add additional topics to the list. Selecting either relationships or money as off-limits topic is as simple as clicking on the box presented to the left of each entry.

The entered off-limits topics 177 need to be understood by all the other participants in the stream 20 in order for these preferences to be respected. In one embodiment, an interface 1500 for the user computer systems 110 is shown in FIG. 15 that introduces the topic limitations 177. In this interface, a user computer system 110 is attempting to finalize an appointment for stream 20 (also referred to as a streaming session 20 or session 20) with luminary Mary Jones. The cost, type of session 20, and the date and time for the session 20 are presented on this interface 1500. In addition, the interface 1500 may request that the user identify a general topic or focus 1510 for the requested stream. Alternatively, the focus of the discussion 1510 may have been input by the user in an earlier interface screen and is simply being presented here for confirmation purposes. By requesting that the user computer 110 identify a proposed focus for the stream 20, the system 10 encourages the user to think about the types of questions and conversations that will be covered. Pre-thinking the topic of the streaming session 20 increases the likelihood that all parties will appreciate and enjoy the stream 20. Immediately adjacent the entering or the confirmation of the requested focus 1510 is a statement 1520 explaining that some topics 177 are off-limits in the conversation. By having the interface display a general focus for the discussion 1510 and the off-limit topics 1520 side-by-side, users will be reminded of the importance of staying away from the off-limit topics 177. Note that the system 10 is not necessarily trying to limit the stream 20 only to the user's identified focus 1510, rather the system 10 uses interface 1500 to emphasize the importance of the user not straying into topics 1520 that are off-limits. To further emphasize this, the interface 1500 presents to the user computer 110 a confirmation statement 1530 where user computer system must receive some action of assent to stay away from the off-limit topics 177 in order to move forward with the process. In the context of FIG. 15, the action of assent required by 1530 is checking the box agreeing to the topic limits.

Although interface 1500 is presented when a user is requesting a video stream 20, a nearly identical interface 1500 can be presented immediately before a user computer system 110 joins the stream 20. The interface 1500 in that context will remind the user of the luminary and other participants on the call, the duration of the call, the identified focus 1510 entered by the user, and the off-limit topics 1520. Furthermore, the interface 1500 in that context can once again require the user computer system 110 submit confirmation 1530 that the user agrees to the topic limits 1520.

Reporting Violation Interfaces

After a session 20 is complete, a feedback interface 1600 is presented to the user computer systems 110 and the luminary computer system 120. The feedback interface 1600 requests standard feedback information about the session 20, such as feedback on the quality of the communication 1620 during the session 20, the timeliness of the participants 1630, and the quality of the audio and visual portions 1640 of the session 20. In addition, the feedback interface 1600 allows participants to report any inappropriate actions to the administrators of the system 10 using report interface element 1610. A flag is illustrated at report button 1610 to indicate that pressing on this interface element 1610 will flag the session 20 and the recorded communications 180 and portions 190 for further review.

If a user flags the session 20 using element 1610, a reporting interface 1700 is presented on the participant's computer system 110, 120. The reporting interface 1700 allows the user to choose one of three reasons to report the session at interface section 1710. The first of these reasons is that the participant arrived late or left earlier. Remember that either a user or a luminary may report a session 20. This arriving late or leaving early reason for reporting a session is most likely to be employed by a user, in that they are paying compensation for the chance to participant in a stream 20 with the luminary. If the luminary does not attend for the full time period paid for by the user(s), they can report the session using interfaces 1600, 1700. The second reason in interface section 1710 is that one of the participants engaged in inappropriate behavior. Frequently, inappropriate behavior by a participant can be embarrassing or even traumatizing to other participants, so this reason give the ability to report this behavior. This reason would likely be selected by both user computer systems 110 and the luminary computer system 120. The third reason set forth in interface 1700 is that the participants failed to follow the topic limitations 177. Listing this reason in interface section 1710 allows the luminary to easily report instances where users asked questions about, or directed the conversation toward, topics that the luminary indicated were off-limit topics 177. Box 1720 allows the reporting participant to provide additional comments or details concerning the activity. At interface section 1730, the reporting participant can ask to engage in further communications with the administrator (or a representative of the administrator) of the system 10. The participant may wish to provide further details or may simply want reassurance that the report has been received and is being handled by the system 10. Finally, button 1740 allows the reporting participant to complete the reporting process and submit their report.

In the preferred embodiment, the reporting of a streaming session using interface 1700 has two immediate effects. First, any compensation that was paid by the user computer participants is frozen. If the stream 20 had not been reported, this compensation would have entered into the payment mechanisms of the system 10, and compensation would be provided to the participant using the luminary computer system 120. Upon the reporting of an issue, no such payment would be made. Second, the recorded communications 180 and portions 190 of the stream 20 are also locked down, meaning that none of the participants can view, download, share, or modify these video files. These two effects are both referred to as quarantines. Both the payment and the videos remain in quarantine until an operator of the administrative computer 130 resolves the report. In some embodiments, the recoded communications 180 and portions 190 of the stream are quarantined only with respect to the party that was the subject of the report, while the preferred embodiment quarantines these video files from all participants during the quarantine.

FIGS. 16 and 17 divide the feedback interface 1600 and the report session interface 1700 into separate interfaces presented at different times to a participant computer system 110, 120. In other embodiments, the content of the two interfaces 1600, 1700 could be combined into a single feedback interface, or the feedback interface could be considered to have two portions including general feedback provided through the elements of interface 1600 and reporting feedback provided through the elements of interface 1700.

Administrative User Interfaces

FIG. 18 shows an overall administrative interface 1800 presented to the administrator computer system 130. This interface 1800 can be considered a dashboard interface, in that it presents an overall picture as to the operation and running of the system 10. In the preferred embodiment, this dashboard interface 1800 presents a plurality of tiles 1812, 1814, 1822, 1832, 1842 that both contain useful information and provide a link to further details about that information. In some embodiments, the tiles 1812, 1814, 1822, 1832, 1842 represent user interface buttons, where a push changes the user interface 1800 to provide more details about the information displayed. In other embodiments, a separate "details" or "go" button can appear within each tile for the same functionality.

These tiles 1812, 1814, 1822, 1832, 1842 are arranged into topical columns identified by topic headings 1810, 8120, 1830, and 1840. In interface 1800, topic column 1810 provides information about feedback received from the participant computer systems 110, 120. In particular, a reported session tile 1812 in this column 1810 indicates that that 6 sessions (streams 20) have been reported using the reporting interface 1700 to the system 10. This number can indicate the total number of streams 20 reported, the total number of streams 20 reported in a given timeframe (today, this week, this month, etc.), the total number of reported streams 20 that are still being processed, or the total number of reported streams 20 that have yet to begin processing by the administrative computer system 130. A second feedback tile 1814 provides the actual feedback scores provided by participants using the feedback interface element 1620 over the last seven days. The accounts column 1820 in interface 1800 presents a single tile 1822 showing the actual number of active accounts. The sessions column 1830 also presents a single tile 1832. This tile 1832 shows the current number of active sessions or streams 20. Finally, the system column 1840 shows an overall diagnostic tile 1842, which in this case shows that the overall status of system 10 is currently "OK."

Tile 1812 shows the administration computer system 130 that six streams 20 have resulted in reports being generated. This tile does not distinguish between reports generated by user computer 110 participants and luminary computer 120 participants. In many contexts, this distinction is important, as resolving reports from luminary computers 120 can be considered more urgent, needing more prompt resolution. Alternative interface 1900 of FIG. 19 shows how separate tiles can be generated based on luminary feedback 1910 and user feedback 1920. Luminary feedback 1910 include a tile 1912 showing that luminaries have reported two stream sessions, while tile 1922 shows that user computers 110 have reported four streams 20. This interface 1900 also includes separate tiles for luminary feedback scores 1914 and user feedback scores 1924.

Selecting tile 1812 (or selecting a button on tile 1812) can result in the presentation of a reported session list interface 2000 on the administrative computer system 130, as shown in FIG. 20. This interface 2000 includes a list 2010 of reported sessions. The list 2010 is presented in a plurality of columns 2020-2060 showing data about each report made. Column 2020 shows the name of the participant that made the report, while column 2030 indicates whether the participant was using a user computer system 110 (the participant was a user) or was using a luminary computer system 120 (the participant was a luminary). The date of the report 2040 and the type of complaint 2050 are also shown. In one embodiment, the type of complaint 2050 is the same information that the user provided in interface segment 1710 in FIG. 17. If multiple types of complaints were made in interface segment 1710 about the same stream 20, multiple complaints will be listed in column 2050. Finally, the status 2060 of the report is also shown. In one embodiment, the status of a report can be a "new" (the report has not yet been processed), it can be a "resolved" complaint (the report has been resolved), or it can be "contacted" (the reporting participant requested personal communication, and that communication has not yet completed).

Interface 2100 of FIG. 21 is used by the administrative computer system 130 to handle each report. A particular report is first selected from the report list 2010 for processing. In the example of FIG. 21, the complaint from luminary Mary Jones has been selected. Once selected, interface 2100 will then present the details from the report list 2010 in the header section 2110 of the interface 2100, including the name 2020 of the participant making the report (Mary Jones), their type 2030 (Luminary), the date of the report 2040 (Aug. 20, 2022), and the type of complaint 2050 (topic limit violation). A contact button 2120 can be placed adjacent to the participant's name in order to initiate a communication with the participant. The communication created by selecting the contact button 2120 can vary according to what is convenient for both the administrator and the reporting participant. For instance, the communication can remain entirely within the application programming 109 provided by the system 10. Alternatively, the communication can occur through email exchanges, text messages, telephone calls, or effectively any type of communication. Preferably, the communication will be initiated automatically through computer programming whenever the administrator computer 130 receives a selection of the contact button 2120.

Because each report is provided about a particular stream 20, details about the stream 20 being reported are also provided in interface 2100. In particular, the scheduled session time 2130 for the stream 20 is presented, along with the time 2140 when the report was made. In this case, the stream was scheduled to run on Aug. 20, 2022 from 8 to 8:15 am Eastern Daylight Time. The report was made by Mary Jones on 8:14 of that same morning. Mary Jones apparently ended the stream 20 before its scheduled finish time and filed a report one minute before the stream 20 was scheduled to end. We know from information 2050 that Mary Jones is reporting that the users in this stream 20 committed a topic limit violation. In particular, Mary Jones provided the comment "Repeatedly discussed income" 2150 when making the report. This comment would be provided in the comment box interface element 1720 of interface 1700. Finally, data element 2160 indicates that Mary Jones did not request personal contact by an administrator, meaning that the administrative computer system 130 is free to resolve this complaint without direct communications with Mary Jones.

Interface 2100 is designed specifically to provide an administrator using computer system 130 with the information needed to understand and resolve the reported complaint 2050. In this case, Mary Jones has reported the stream 20 for violating her off-limit topics preferences 177. Thus, interface 2100 will display at 2170 the off-limit topics pre-selected by Mary Jones. In this case, luminary Mary Jones previously used interface element 1422 to indicate that she did not want to discuss income or relationships. We know from interface elements 1520 and 1530 that the user computer systems 110 participating in this stream 20 must have all agreed to not discuss these topics 2170. As a result, if the comment 2150 is accurate, the user computer systems 110 participating the stream 20 violated that requirement.

The presentation of off-limit topics 2170 in interface 2100 may not be necessary if the complaint 2050 was not related to a topic limit violation. For instance, if the complaint 2050 was that a luminary computer system 120 left the stream 20 early, or arrived late, the off-limit topics 2170 would be irrelevant. Instead, it would be necessary for the administrative computer 130 to know when each participant joined and left the stream 20. This information is presented on interface 2100 at interface element 2180. While some embodiments may always provide both the off-limit topics 2170 and the start and stop times for participants 2180 in interface 2100, other embodiments may selectively provide one or the other depending upon the complaint 2050 presented in the report.

In most every report, the administrative computer 130 will need to present the actual recording of the stream 20, which is found communication data entity 180. Selecting button 2190 will present this recording 180, allowing the administrator to play, fast forward, and rewind through the recorded stream 180 as necessary to verify the complaint 2050. In one embodiment, the recording 180 will play in a pop-up window over this interface 2100.

Once the communication recording 180 has been reviewed, the interface 2100 will be ready to receive the resolution of the report through buttons 2192-2198. Remember that the compensation paid and the communication 180 and portions 190 were automatically put into quarantine on the making of the report. If the administrator does not find a violation after reviewing the communication 180, button 2192 will be pressed. This will release the payment, the communication 180, and the portions 190 from quarantine. Participant computers will then be able to play, download, and share the communication 180 and portions 190, and modify the portions 190 as desired. Furthermore, the compensation paid by the users will be distributed, in part, to the luminary using the luminary computer system 120.

If the user was in violation of the established policies (discussing the off-limit topics 177, for instance), button 2194 will be pressed. In this case, the communication 180 and portions 190 will be kept in quarantine indefinitely. The user computer systems 110 will not be able to access their recorded communication 180 or any of the portions 190 that they created. The payment will be accepted, and the luminary will be compensated for their participation in the stream 20.

If a user computer system 110 reported a violation from the luminary (such as the luminary showing up early or late, or unacceptable behavior), the review of the report may indicate that the luminary was in violation. In this case, button 2196 may be pressed. This means that the payment would be reimbursed to the user computer systems 110. In most embodiments, the communications 180 and the portions 190 would remain quarantined, but some embodiments may release some or all of these recordings 180, 190 to non-violating users. Button 2198 is used merely to indicate that this report has been resolved. Upon pressing this button 2198, the report status 2060 will change to resolved, and interface 2100 will close. In other embodiments, no "mark as resolved" button 2198 is presented, and pressing any of 2192, 2194, and 2196 will automatically mark the report as resolved. Once resolution is reached on a report, communication will be provided to all of the participants concerning the resolution.

Method for Content Monitoring and Quarantine

Figure 22:
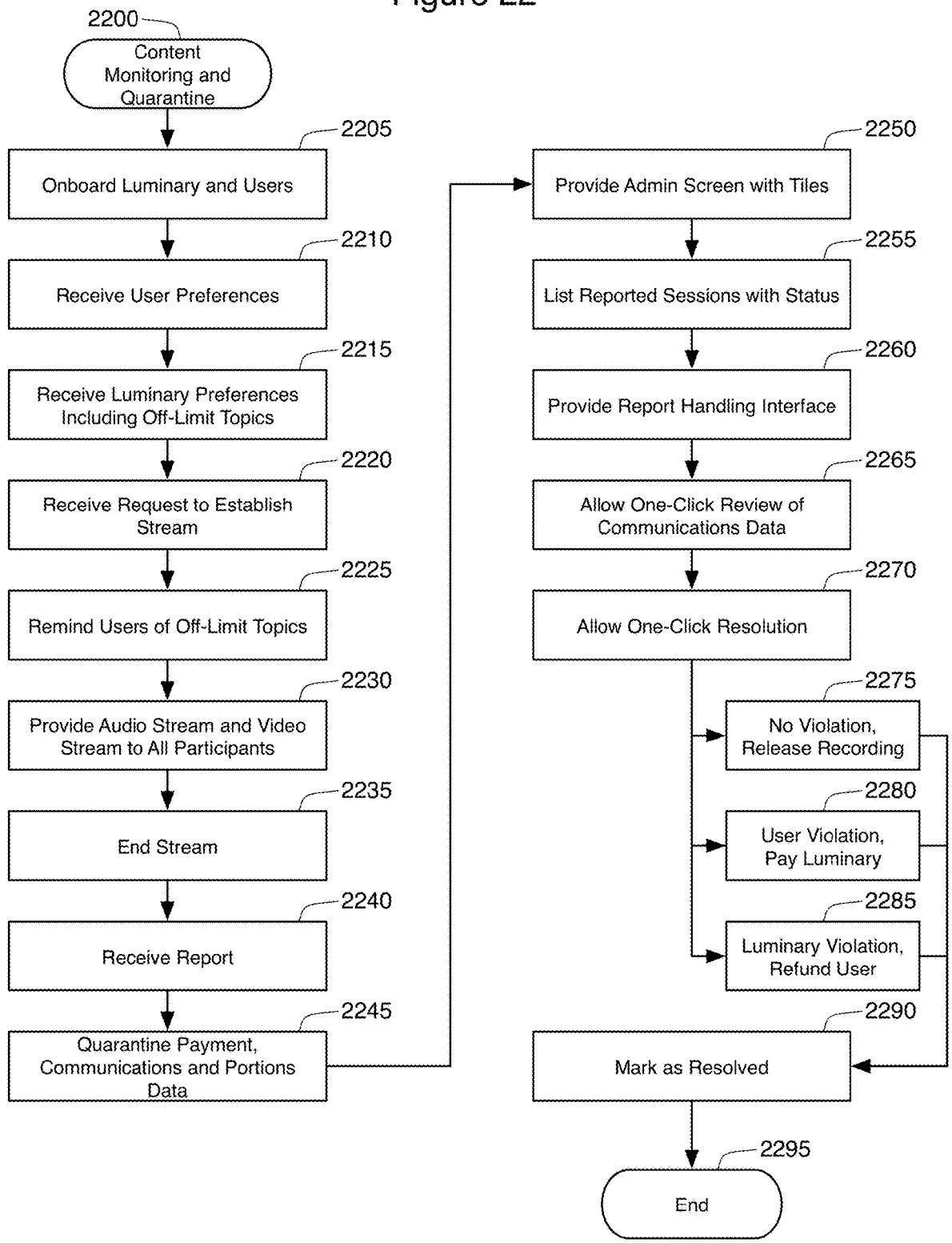
FIG. 22 is a flow chart showing a process of content monitoring, quarantine, and resolution.

A method 2200 for content monitoring and quarantine is shown in the flow chart of FIG. 22. The first step 2205 is the onboarding of the luminary and users, which is similar to step 1305 discussed above. Preferences 176 are received from the user in step 2210, while preferences of the luminaries are received in step 2215. The latter step 2215 will include receiving normal preferences 176 while also receiving one or more off-limit topics 177 for the luminary.

At step 2220, the system 10 receives a request to establish a stream communications session. Before beginning the stream 20, the system 10 will reminder the user computers systems 110 of the off-limit topics at step 2225. As shown in user interface 1500, this can include a requirement that the user computer systems 110 receive input of an affirmative agreement 1530 that the users agree to abide by this off-limit topics requirement. At step 2230 the stream 20 is provided to the participants, and at step 2235 the stream 20 is concluded. The conclusion of the stream 20 may be because of the pre-determined ending time had been reached. Alternatively, one or more of the participants may have terminated the stream 20 early because of some violation of the rules or standards by other participants.

At the end of the stream 20, the feedback interface 1600 will be presented to the participants. This interface 1600 includes a user interface element 1610 that can be selected to report a violation of standards or rules. If element 1610 is selected, the report interface 1700 will allow participants to provide a reason 1710 for reporting the stream 20. The interface 1700 also allows the participant to leave comments 1720 about the stream 20 that would helpful during the review process, and request a contact from an administrator 1730. The system server 100 receives this report at step 2240.

Once the report is received, the system server 100 will quarantine the payment made for the stream 20 and will also quarantine any communication 180 and portions 190 created from the audio and visual content of the stream 20. This occurs at step 2245. While in quarantine, the payment is not distributed to the luminary, and none of the participants are able to access the communication 180 or portions 190.

At step 2250, the system server 100 provides the administrator computer system 130 with an administration interface 1800 containing tiles 1812, 1814, 1822, 1832, 1842 providing information about the system 10 and links to further details. This occurs at step 2250. If the administrator computer system 130 receives a selection of the reported streams tile 1812 (or tiles 1912, 1922 from alternative interface 1900), a list of reported sessions 2010 is provided through interface 2000 at step 2255. By selecting one reported stream 20 from the list, a report handing interface 2100 is provided to the administrator computer system 130 (step 2260). This interface 2100 provided details about the stream 20, about the off-limits topics 177 specified by the luminary, and about the various start and stop times for each of the participants in the stream 20. Using a single click of button 2190, the user of the administrative computer system 130 is able to immediately see a playback of the stream 20 by playing the communication video file 180 (step 2265). In this way, the administrator is able to immediately compare the actual content of the stream 20 with the reported reason 2050 and comments 2150.

After the review of step 2265, method 2200 is able to provide a one-click resolution of the report at step 2270. This resolution is performed by clicking one of buttons 2192, 2194, or 2196 on interface screen 2100. As explained above, if the administrator does not find a violation, button 2192 will be pressed at step 2275, which will release the payment, communication 180, and the portions 190 from quarantine. If the user was in violation, button 2194 will be pressed at step 2280, meaning that the communication 180 and portions 190 will be kept in quarantine indefinitely, and the luminary will be compensated for their participation in the stream 20. If the luminary was in violation, button 2196 may be pressed at step 2285, meaning that the payment received from the user computer systems 110 will be reimbursed. At step 2285, the communications 180 and the portions 190 can remained quarantined, but some embodiments may release these items 180, 190 to the non-violating users. After selecting one of these buttons 2192, 2194, or 2196, the report on this stream 20 is marked as resolved at step 2290. In some embodiments, an additional button 2198 may be pressed as an extra step resolve the report. Once resolved, a communication is transmitted to the participants concerning the resolution.

The system 10 and the method 2200 can be utilized to present a plurality of different streams 20 to different pluralities of participant computer systems 110, 120. Different reports from these different streams 20 results in the plurality of reported sessions found in list 2010. In resolving these different reports, the same administrative computer system 130 can resolve some reports as having no violation of any rules and thereby releasing the payment and video 180, 190 from quarantine (step 2275), and resolve other reports as showing that a violation took place, thereby maintaining the quarantine on the video files 180, 190 while distributing the payment is an manner consistent with the parties actions.

The interfaces shown in FIGS. 14-21 and described above allow for more control over the content of a multi-party video stream then any content control interfaces previously known to the inventors. Users are required to agree to avoid off-limit topics 177 specified by luminaries. Luminaries and users can easily report problem behaviors during the session 20 through the interface screen immediately presented after the stream 20 is terminated. Reports made through this interface immediately result in quarantining video access to portions 190 and the stream 20 as a whole, as well as quarantining any compensation paid for participating in the stream. Administrative interfaces 2000, 2100 allow for quicker understanding of the reporting issues, quicker review of the potentially offending stream 20, and quicker resolution of the report than any known prior art interfaces.

Meet Now Instigation

FIG. 23 shows a luminary dashboard interface 2300 that is presented on the luminary computer system 120. The dashboard interface 2300 presents useful information about the system 10 to the luminary using computer system 120. From this interface 2300, the luminary can edit their profile and preference settings 176 by simply pressing button 2310. By editing profile settings, the luminary can change data entered during the on-boarding process, such a biographical data and images. This button 2310 will also allow a luminary to alter their preference settings 176 including their list of off-limit topics 177

Interface 2300 also identifies the user's scheduled availability for future streams 2320; their upcoming, already scheduled streams 2330; their previous, already completed streams 2342; and the saved portions 2350 comprising the portions 190 that they saved during previous streams 20. Each of these interface sections 2320, 2330, 2340, 2350 can be presented in interface 2300 as a list. In one embodiment, each item in the list 2320, 2330, 2340, 2350 can be separately selected and viewed/edited from this interface 2300. In other embodiments, the lists 2320, 2330, 2340, 2350 are presented along with edit or play buttons 2322, 2332, 2342, 2352 associated with each list 2320, 2330, 2340, 2350, respectively. For example, if the luminary wishes to edit their available times, they can press interface button 2322. Similarly, if they wish to edit an upcoming stream 20 or even start a soon-to-start stream 20, they will utilize button 2332. Buttons 2342 and 2352 can be used to play and edit recorded stream communications 180 and stored portions 190, respectively.

In addition to these other elements, user interface 2300 presents a meet now button 2360. The meet now functionality offers a different technique for scheduling/initiating a stream 20. Rather than creating a schedule of available times (as would be shown in list 2320), the meet now feature allows the luminary computer system 120 to become immediately available for entering into a stream 20 with any user computer systems 110 that is available and interested in participating.

FIG. 24 shows how the meet to functionality is provided by the application programming 109 of the system server 100. As explained above, this application programming 109 include the connection programming 140, the portion creation programming 150, and the portion modification programming 160. The connection programming 140 includes scheduling programming 2400. Scheduling programming 2400 allows the luminary computer system 120 to established times 2320 during which the luminary computer system 120 is available for a stream 20. User computer systems 110 can review these times 2320, select a time, pay for the session, and then connect at the scheduled time with the luminary computer system 120 in the stream 20.

Connection programming 140 also includes meet now programming 2410. The meet now programming 2410 and overall process is sometimes referred to as the "live call" or "live stream" process. The meet now programming 2410 is shown in FIG. 24 with four different components or parts 2420, 2430, 2440, 2450. Although FIG. 24 shows this programming 2410 with these four parts 2420, 2430, 2440, 2450, once again this division is illustrative only, as there is no requirement that the programming 2410 be physically or even functionally separated into these elements.

This first element is the start stream programming 2420. This programming 2420 receives the request from the luminary computer 120 to start a meet now stream, such as through the selection of button 2360 in interface 2300. In addition, the start stream programming 2420 will receive requests from user computers systems 110 to participate in the meet now stream, and will join the various participating computer systems 110, 120 into the meet now stream. The operate stream programming 2430 is responsible for receiving the audio and visual data from the participating computer systems 110, 120; generating the stream; storing the communication database entity 180; and receiving the requests for, and creating, portions 190.

The queue programming 2440 generates and maintains a queue or waiting list for the meet now stream. In the preferred embodiment, only a limited number of user computer systems 110 can participate in a meet now stream with a luminary computer system 120. This limit is especially important because, in most cases, the individual user computer systems 110 that are participating in the meet now stream 20 were not related or connected to each other. This is not usually a group of friends participating in the stream 20, which is frequently the case with streams created with the scheduling programming 2400. Rather, this is either a first-come, first serve stream or an auction-based stream. Therefore, it is best to limit the number of participants in the stream to ensure a quality experience for everyone. In some embodiments, the positions of the user computer systems 110 in the queue is maintained, in part, by auction programming 2450. This programming 2450 allows user computer systems 110 to contribute additional compensation to change their position with the queue. In some embodiments, this additional compensation is directed toward charitable organizations, with only the original per-minute fees being shared between the luminary and the operators of the system 10.

Figure 25:
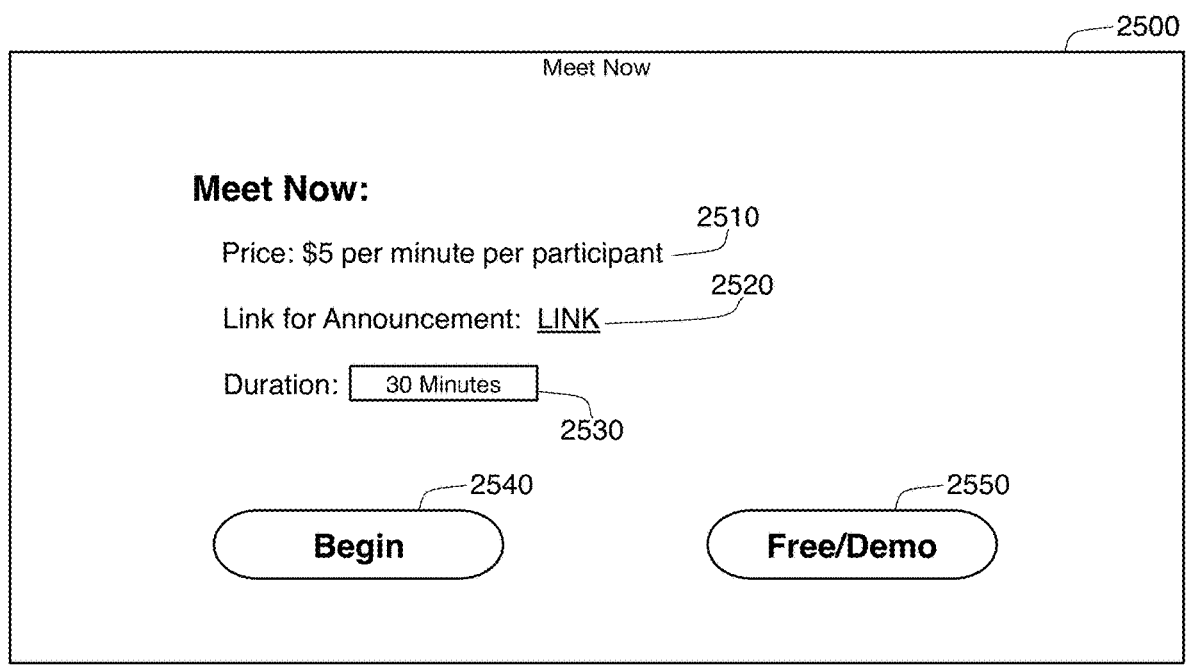
FIG. 25 is a computer interface screen for establishing a meet now session.

If the luminary computer system 120 receives a selection of the meet now button 2360, a meet now confirmation interface 2500 as shown in FIG. 25 will be presented. This interface 2500 includes a reminder of the rate that will be charged per participant 2510 in the meet now stream 20. This rate can be changed in the luminary preferences 176 through button 2310. Meet now streams 20 are generally limited to the participation of about three or four user computer systems 110 along with the luminary computer system 120. At the rate 2510 of $5 per minute, a total charge of $1,200 per hour would be collected if four user computer systems 110 were allowed to participate in the stream 20.

Figure 26:
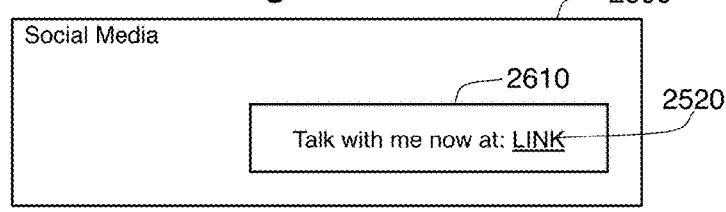
FIG. 26 is a schematic view of a social media system.

Interface 2500 also shows a link 2520 that can be used for user computer systems 110 to request participation in the meet now stream 20. This link 2520 can take the form of a URL link and can be used by the luminary computer system 120 to spread the word that the luminary is now conducting a meet now stream 20 on system 10. For example, the link 2520 can be included in a social media post 2610 on social medial platform 2600, as shown in FIG. 26. This post 2610 might be, for example, a tweet 2610 on the Twitter social media platform 2600 (provided by Twitter, Inc. of San Francisco, Calif.), or an Instagram post 2610 on the Instagram platform 2600 (provided by Facebook, Inc. of Menlo Park, Calif.). Followers of the luminary on these platforms 2600 can follow the link to an Internet location that submits requests to join the meet now stream 20 to the system server 100.

Returning to FIG. 25, interface 2500 also include the ability for the luminary computer system 120 to receive a duration 2530 for the meet now stream 20. If a duration 2530 is selected, the operate stream programming 2430 will track the duration of the stream 20 and provide warnings when the time is almost over. The stream 20 can close automatically at the end of this duration 2530, or a message can be presented on the luminary computer system 120 stating that the duration 2530 has now elapsed. If only a message is shown, then the operate stream programming 2430 will only close the stream 20 after receiving an explicit instruction to end the stream 20 from the luminary.

Button 2540 instructs the system server 100 to begin the meet now stream 20. Any user computer systems 110 that choose to enter this stream 20 will be charged rate 2510. In some circumstances, it may be desirable to have a free meet now stream. This might be done at the desire of the luminary to have a no-charge stream 20, or merely to test or demonstrate the meet now process. If a free stream 20 is desired, button 2550 will be selected. This will also start the meet now stream 20, but user computers systems 110 that enter this stream 20 will not be charged.

Figure 27:
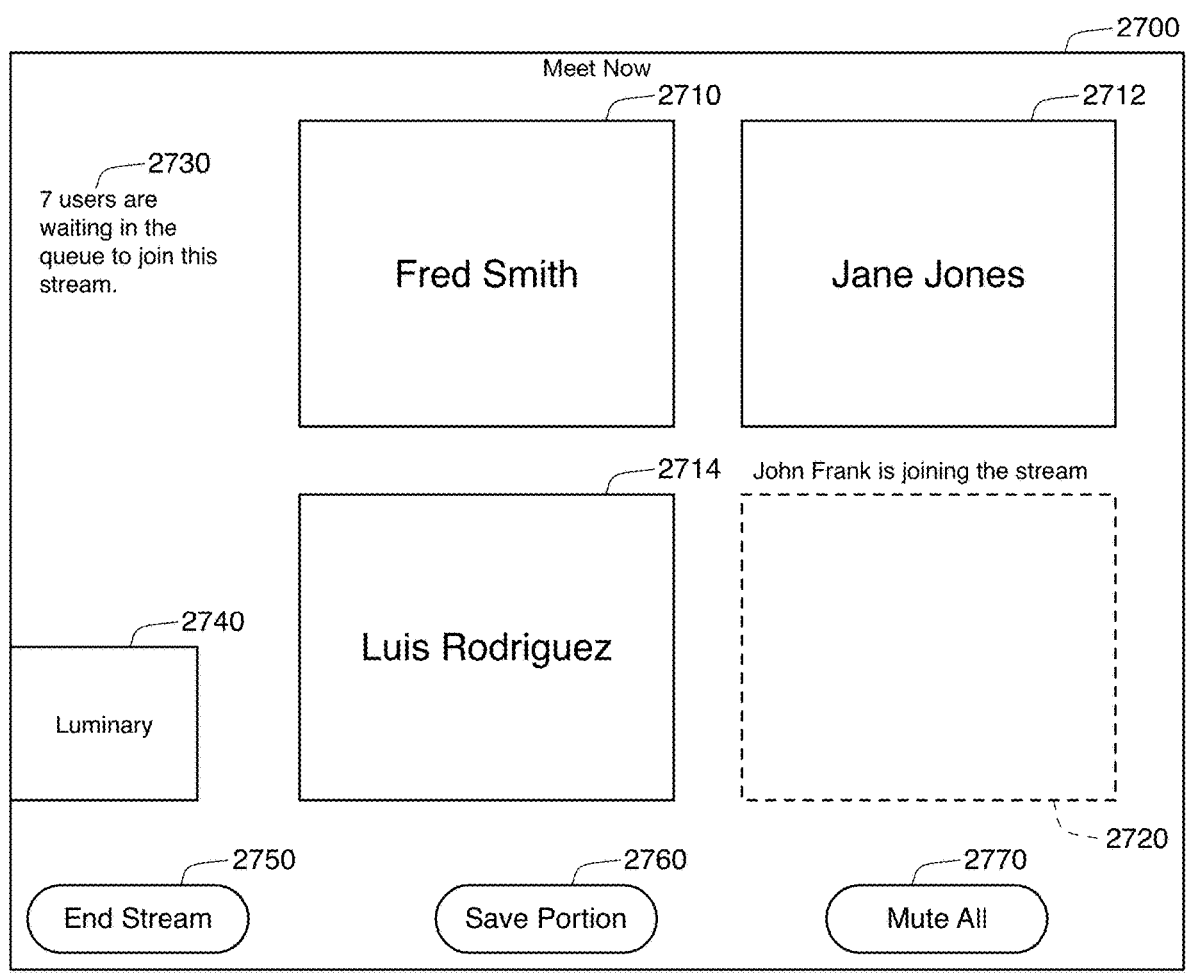
FIG. 27 is a computer interface screen for a luminary computer system participating in a meet now stream.

When the meet now stream 20 has begun, a user interface 2700 such as that shown in FIG. 27 will be presented through the luminary computer system 120. In FIG. 27, three user computer systems 110 are currently communicating with this luminary computer system 120 over the meet now stream 20, with the visual data 240 from these computers systems 110 being presented in interface areas 2710, 2712, and 2714. In the preferred embodiment, the names associated with the users operating these user computer systems 110 are displayed in or adjacent to these areas 2710, 2712, 2714. This allows the luminary seeing this interface 2700 to know that visual images of Fred Smith appear at 2710, Jane Jones at 2712, and Luis Rodriguez at 2714. This interface 2700 is configured to allow four user computer systems 110 to be presented. The fourth location 2720 in FIG. 27 indicates that a new user computer system 110 (one associated with John Frank) is about to join the meet now stream 20. Meet now streams 20 are designed to have participants leave the stream and new ones join. In this case, one user computer system 110 may have just left, and a new fourth user computer system 110 belonging to John Frank is replacing the departing system 110 at location 2720.

The interface 2700 also shows at 2730 that there are a total of seven users waiting in the queue. Thus, we know that the new user computer system 110 joining at location 2720 is likely arriving after waiting in that queue. Location 2740 of interface 2700 shows the visuals being provided to the stream 20 by the luminary computer system 120 so that the luminary can see their own image.

At the bottom of interface 2700, three control buttons 2750-2770 provide control options. The luminary can end the stream 20 by pressing button 2750. User computer systems 110 are all warned that the luminary computer system 120 can end the stream 20 whenever desired. This button 2750 provides that ability. Button 2760 allows the luminary to send signal 252 to the system server 100 requesting that a portion 190 be generated for the luminary. Finally, button 2770 gives the luminary computer system 120 the ability to control the audio of all other participants in the stream. If a stream 20 is getting out of control, or one user computer system 110 is unduly dominating the conversation, or if the luminary wishes to give a warning or reminder about off-limit topics 177, the mute all button 2770 can be pressed and the luminary computer system 120 will be the only participant that can transmit audio over the stream 20. In other embodiments, audio from the other participants is reduced but not completely eliminated in order for the luminary computer system 120 to be the only audible source of audio on the stream. The button 2770 can be pressed again to return audio capabilities to the other participants.

This interface 2700 is not significantly different than the interface that would be provided to the luminary computer system 120 during a stream 20 created by the scheduling portion 2400 of the connection programming 140. With scheduling programming 2400, there would be no queue, so no need to identify the number of users in the queue 2730.

Nor would user computer systems 110 leaving the stream 20 be automatically replaced by new user computer systems 110. But otherwise, the interface could be effectively the same.

User Interaction with a Meet Now Stream

Figure 28:
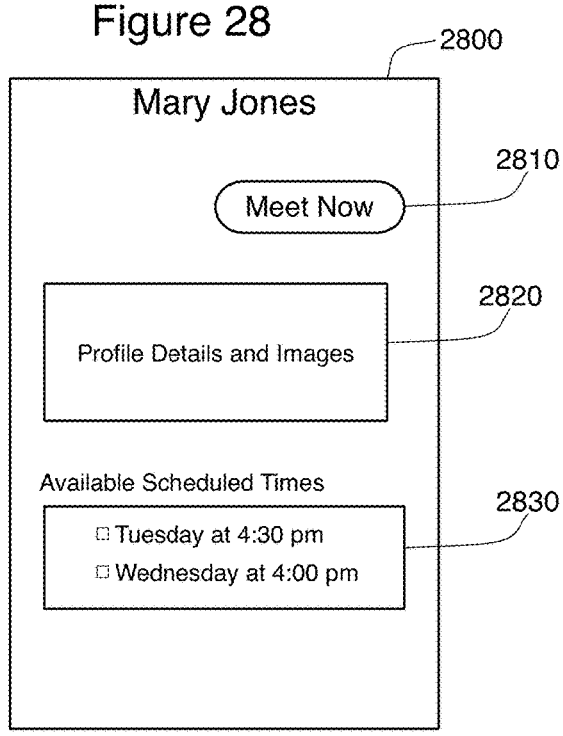
FIG. 28 is a computer interface screen showing a luminary provide and including a meet now button.

User computer systems 110 may learn about an imminent or currently running meet now stream 20 in a variety of ways, including social media posts 2610 or other direct communications with the luminary. In addition, the system server 100 can communicate this directly to connected user computer systems 110. In FIG. 28, a luminary profile interface 2800 is shown as it might be presented on a user computer system 110. In this case, luminary Mary Jones has shared details about her life and profession, including images, at location 2820, and also has indicated her schedule of available times for a scheduled stream 20 at location 2830. This schedule 2830 could be reviewed by the user computer system 110, and an open time slot could be accepted. The scheduling programming 2400 would then schedule the stream 20 and initiate the stream with the participants at the scheduled time. This interface 2810 also includes a meet now button 2810. The presence of this button 2810 on the profile interface 2800 indicates that Mary Jones is currently participating (or about to participate) in a meet now stream 20. If the meet now button 2810 were absent, this would mean that Mary Jones is not hosting a meet now stream 2810.

Figure 29:
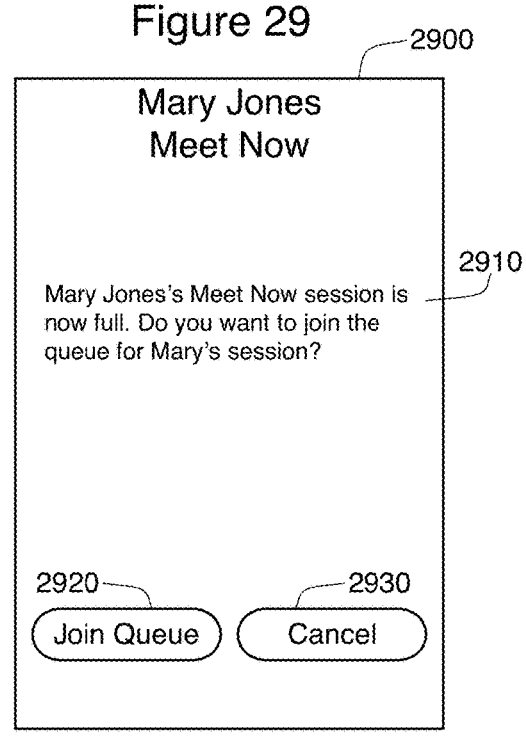
FIG. 29 is a computer interface screen showing queue information.

If a user computer system 110 receives a selection of this button 2810, the system server 100 will check to see whether there is currently space in the meet now stream of Mary Jones. If all of the slots (such as slots 2710, 2712, 2714, 2720) available for user computer systems 110 to participate in the meet now stream 20 is full, interface 2900 of FIG. 29 will be presented on the user computer system 110. This interface 2900 includes an explanatory message 2910 that indicates that the meet now stream 20 is current full, but that it is possible to wait in a queue for an open slot in the stream 20. The interface 2900 presents two options in response to this message 2910: to join the queue using button 2920, or to cancel the request to meet now with Mary Jones using cancel button 2930. If the cancel button 2930 is pressed, the user computer system 110 returns to interface 2880.

Figure 30:
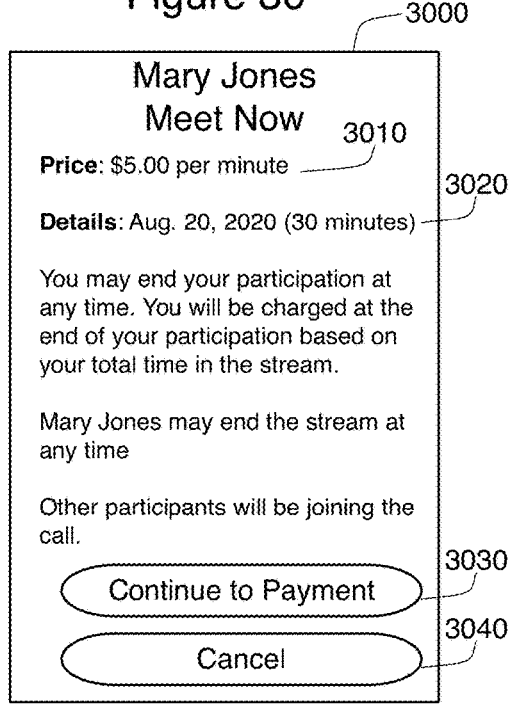
FIG. 30 is a computer interface screen showing meet now details.
Figure 31:
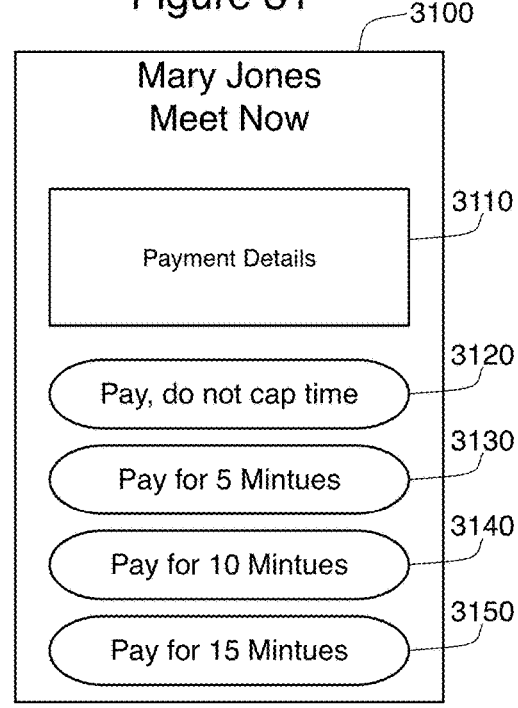
FIG. 31 is a computer interface screen showing payment selection details.
Figure 32:
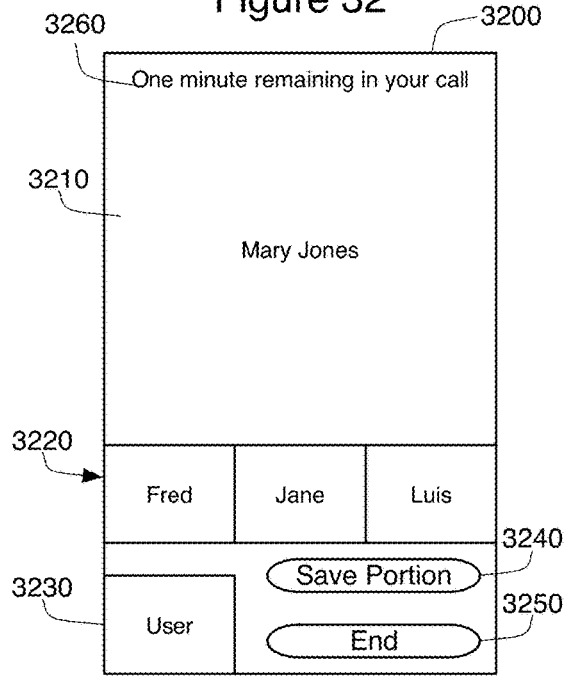
FIG. 32 is a computer interface screen for a user computer participating in a meet now stream.

If there is an available slot after button 2810 is pressed, or if the user agrees to join the queue using button 2920, interface 3000 of FIG. 30 is presented. The purpose of this interface 3000 is to ensure that the user is aware of the details of the meet now stream 20, including the pay-per-minute requirement. Thus, this interface 3000 presents the cost for participation 3010 up front. Following this is the details concerning the stream 3020, including the date, the fact that the luminary computer system 120 can end the stream at any time, and the fact that there will be multiple user computer systems 110 participating in the stream. After presenting this information, the interface 3000 again presents two options. The first is to continue with the process at button 3030, and the second is to cancel the process at button 3040 and return to interface 2800.

If the user computer system 110 receives a request to continue with the meet now process through button 3030, the payment interface 3100 is presented. The first portion of this interface 3100 is the payment details 3110, which allows the user computer system 110 to provide payment details (such as credit card information) so that payment can be made for participating in the meet now stream 20. After these details are accepted, the user computer system 110 must determine whether the user wants to approve payment for an open-ended participation in the stream 20, or whether the user wants to cap their payment for a set number of minutes. If the user wants to leave their time in the stream open-ended, they will select button 3120. In spite of selecting this button 3120, the luminary computer system 120 may have set a duration 2530 which will define the upper limit of the participation of any user computer system 110. For example, the system 10 may prevent any one user computer system 110 from participating longer that thirty minutes in any meet now stream, or the luminary computer system 120 may set this limit at fifteen minutes through preference settings 176. Furthermore, as explained above, the luminary computer system 120 has the ability end the stream using button 2750 at any time. But outside of this, the user that selects button 3120 wants to be free to stay on the meet now stream as long as possible. Other users may wish to cap their participation because of the per-minute charges. Thus, a user that wants to pay for only five, ten, or fifteen minutes will select buttons 3130, 3140, or 3150, respectively.

Assuming that there is an open place in the meet now stream for the current user, the stream interface 3200 will next be presented on the user computer system 110. This interface emphasizes the visual data 242 received from the luminary computer system 120 by providing interface area 3210 for its display. Visual data from the other user computer systems 110 are also displayed in areas 3220. In this case, the luminary is named Mary Jones, and the other user computer systems 110 are associated with users Fred, Jane, and Luis. In order to connect names with the visuals, these names are displayed in interface 3200 on or near the same areas 3210, 3220 where the visuals from these systems 110, 120 are presented. The participant's own visuals are presented in corner 3230 so that the user can see the visuals that they are sharing with the other participants. Interface buttons 3240, 3250 are provided to allow the user computer system 110 to receive instructions to save a portion 190 or to end this computer system's participation in the meet now stream 20. If the user selected a limited time segment of participation by selection one of buttons 3130, 3140, 3150, a time warning 3260 will appear on interface 3200 at the appropriate time to let them know that their time on the stream 20 is approaching its end. Similarly, if the end of the duration 2530 specified by the luminary computer system 120 is also approaching, a similar warning will appear on the streaming interfaces 2700, 3200 of all participants in the stream 20.

Meet Now Queue

Figure 33:
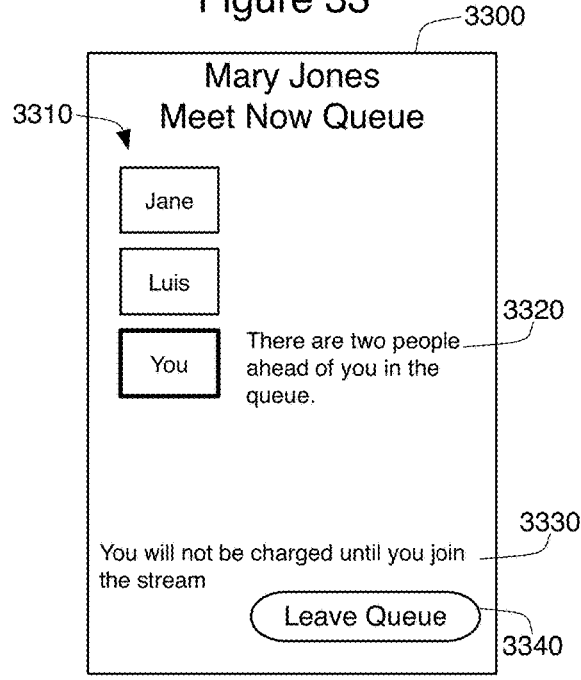
FIG. 33 is a computer interface screen for a meet now queue.

If there were no open slots in the meet now stream 20 after the presentation of interface 3100, the queue interface 3300 of FIG. 33 will be displayed rather than the streaming interface 3200. The queue interface 3300 informs the user computer system 110 of its place on the queue. In FIG. 33, the parties in the queue are shown on list 3310. In addition, description 3320 specifically identifies where on the queue the user computer system 110 resides. An option to leave the queue and not participate in the meet now stream is presented with button 3340. Near that button 3340 is a reminder 3330 that the user computer system 110 will not be charged if they do not enter the meet now stream 20. The user will see their position rise in the queue until they are at the top of the queue. At that point, when a slot opens in the meet now stream 20, they will be presented the streaming interface 3200.

Figure 34:
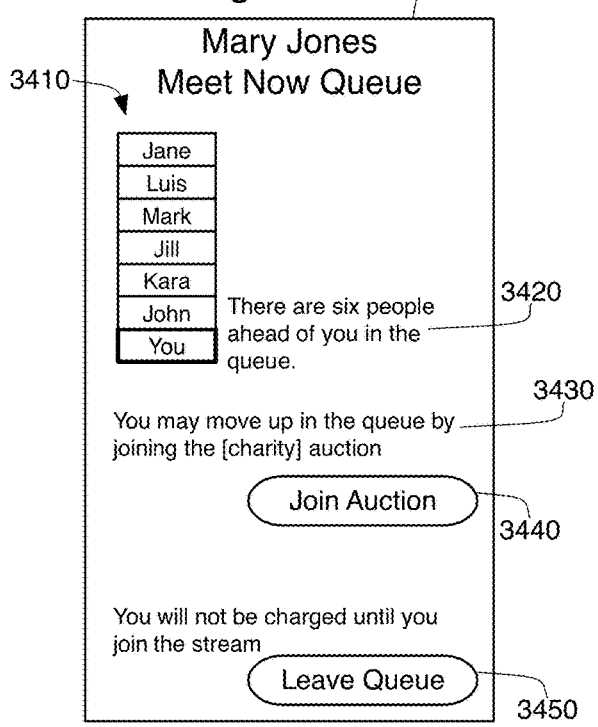
FIG. 34 is a computer interface screen for an alternative embodiment of a meet now queue.

FIG. 34 presents an alternative queue interface 3400. In this interface, there are six people ahead of the user computer system 110 displaying the interface 3400, as shown by the list 3410 and the statement 3420. This interface 3400 provides users with an ability to move their way up the queue by participating in an auction system. This is explained at description 3430. The user can select to join the auction by pressing button 3440. As was the case with interface 3300, the user can also leave the queue without joining the stream 20 by pressing button 3450.

If the user elects to join the auction through button 3440, the user computer system 110 will display the bidding interface 3500. In this interface, the queue list 3510 has been augmented by showing the bids submitted by the members of the queue. For example, Jane has bid $10 to secure her place at the top of the queue, while Luis has bid $8 to be second. Mark has bid only $1, so is placed in third. The other participants are not bidding, so they are placed in the queue based upon the timing of their entry into the queue.

Interface 3500 explains at description 3520 that a bid of $11 will move the user computer system 110 displaying the interface 3500 to the top of the queue. The bid is entered at interface element 3530. Once an amount is entered, the user computer system 110 can accept the bid at interface button 3540 or cancel out of the bidding through button 3550. If this interface 3500 is canceled, queue interface 3400 is once again presented.

Figure 35:
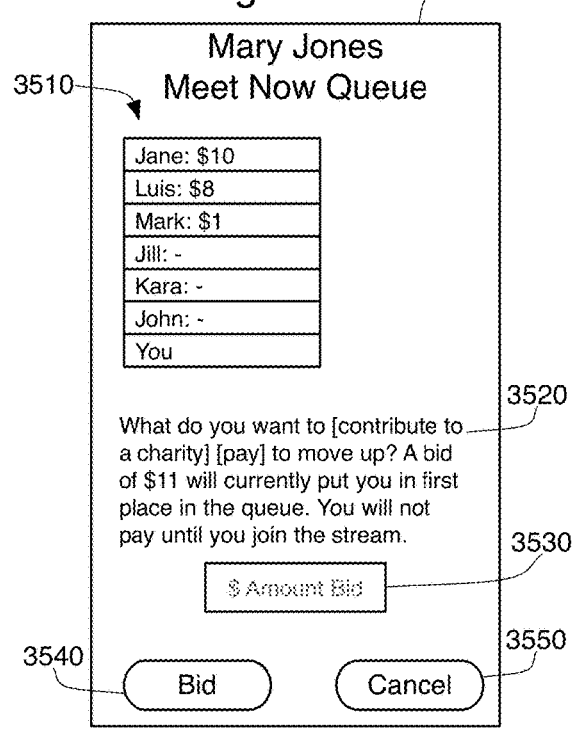
FIG. 35 is a computer interface screen for a queue location auction.

In some cases, the bidding and auction presented in FIGS. 34 and 35 is run for the benefit of one or more charities. This is why the alternative charity language is presented in description 3520. In one embodiment, the operators of the system 10 determine which charity receives these auction funds. In another embodiment, the luminary computer system 120 selects a particular charity through interface 2500.

In some embodiments, user computer systems 110 are not allowed to specify the time frame for which they participate in the meet now stream. In these embodiments, a fixed time period is assigned to all of the participating user computer systems 110. For instance, a luminary computer system 120 may specify a 15-minute duration for their call. In order to give equal opportunities to their fans, a luminary may state that each user computer system 110 may spend only five minutes on the meet now stream 20. This five-minute time period per user computer system can be selected through interface 2500. In other embodiments, all meet now streams 20 controlled by system 10 impose a five-minute limit on participating user computer systems 110. If all user computer systems 110 have the same time limit, the user computer systems 110 participating in a meet now stream 20 would generally arrive in the stream 20 together. When their time limit is reached, these user computer systems 110 would then leave the stream 20 together, with a new group then entering from the queue.

Although the user computer system interfaces shown in FIGS. 28-35 are shown in a vertical orientation of the type used in mobile devices, and the luminary computer system interfaces 2300, 2500, 2700 are shown in a horizontal orientation of the type used in desktop and laptop computers, these interfaces are not restricted to these types of orientations. The presented interfaces are merely examples of the types of interfaces that can be presented on the computers systems 110, 120, 130, and the information, inputs, content, and controls described herein could be implemented both on mobile devices and traditional computer systems.

Method for Performing Meet Now Streams

Figure 36:
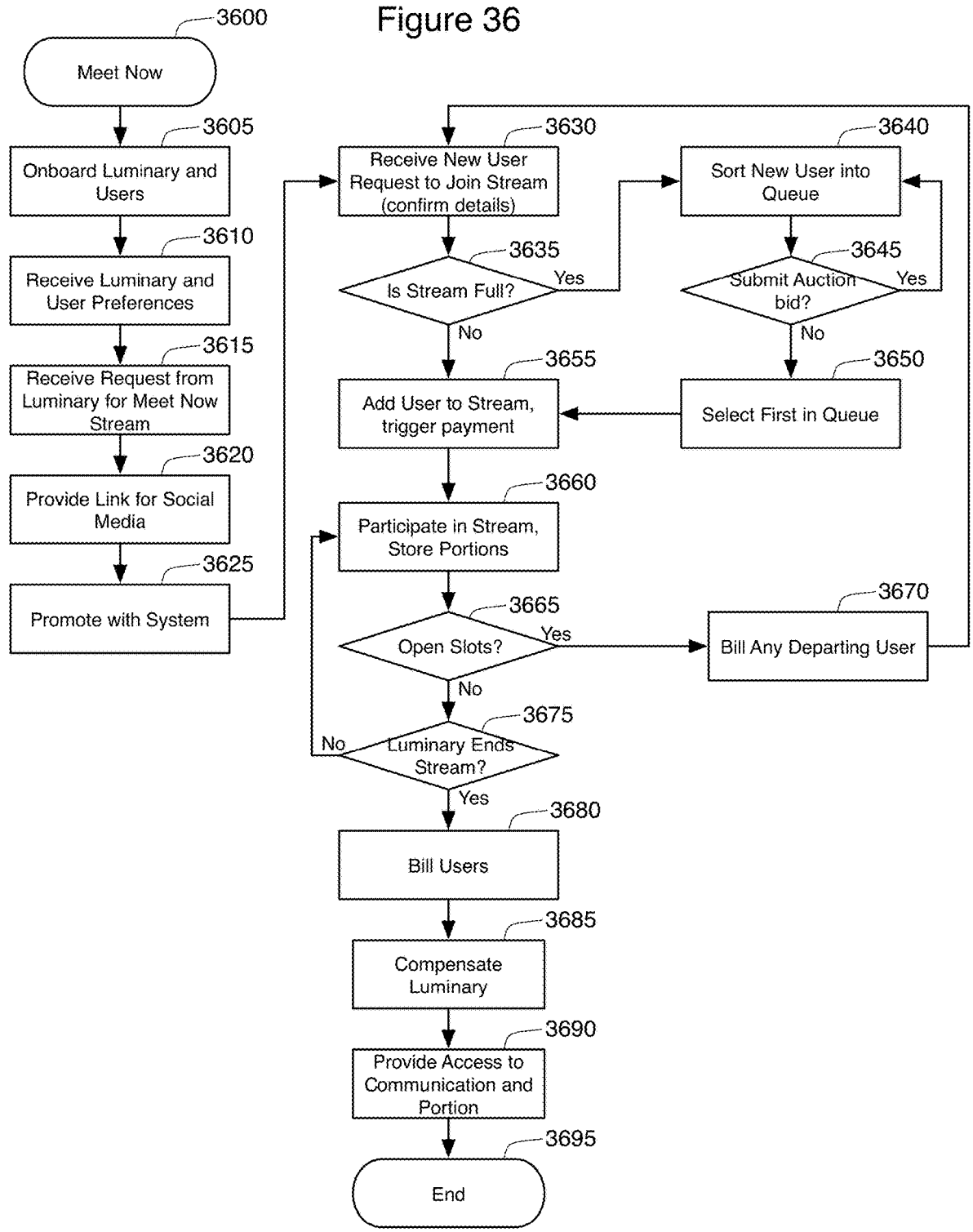
FIG. 36 is a flow chart showing a process of operating a meet now stream and associated queue.

FIG. 36 shows a flowchart outlining a method 3600 for instigating and operating a meet now stream 20. The method starts at step 3605 with onboarding user and luminary computers systems 110, 120, effectively creating data entities 174, 176 in database 170. In one embodiment, however, the system 10 allows unregistered users to join a meet now stream 10 before they have registered and been associated with a user data entity 174. When such guest users have completed their involvement with the meet now stream 20, they will be unable to review the communications 180 or portions 190 files until after they have completed the onboarding step 3605. While a luminary computer system 120 is usually operated by a luminary (an individual of some fame or expertise such that users would be interested in communicating with the luminary), the meet now process 3600 may be utilized by any organizer taking the role of the luminary. Thus, although the following description refers to a luminary computer system 120, the method 3600 (and the above descriptions and interfaces) work equally well with any organizer computer system taking the same role. At step 3610, the system 10 receives preference information 176, 177 from each user and luminary. This may include preferences related to the meet now stream 20, such as cost 2510 and duration 2530 preferences for luminary computer systems 120, and payment details 3110 for user computer systems 110. Receiving this type of preference information 176 at this point will negate the need to receive this information in association with interface 2500 and 3100.

At step 3615, the system receives a request from a luminary computer system 120 indicating a desire to begin a meet now stream 20. Such a request can come from selecting button 2360 on interface 2300. Before beginning the stream 20, the system 10 will present to the luminary computer system 120 a link 2520 that can be shared by the luminary computer system 120 with others, such as through social media platform 2600. This occurs at step 3620. The system 10 also promotes the meet now stream 20 through system server 100, which shares the existence of the meet now stream 20 with user computers 110, such as by presenting interface element 2810 on luminary profile interfaces 2800 seen by those user computers 110.

At step 3630, the meet now stream 20 has begun, and a first user computer system 110 has requested to join the stream 20, such as by selecting button 2810. The method 3600 next checks at step 3635 to see if the stream 20 is full. A full stream 20 means that all of the slots (such as positions 2710, 2712, 2714, and 2720) available for user computer systems 110 in the stream 20 are already occupied. If not, step 3655 explains the meet now process to the user computer system 110 and accepts payments and preferences from the user (see interfaces 3000 and 3100). The user computer system 110 is then added to the stream 20. At step 3660, the added user computer system 110 can participate in the stream 20 through audio and visual data 240, can watch the stream 20 through interface 3200, and can request that portions 190 be created from the stream 20. If there are still more open slots, as determined by step 3665, the system 10 will receive new user computer systems at step 3630. Before doing so, however, the system 10 will determine if the slot is available because a user computer system 110 has just left the stream 20. As explained above, a user computer system 110 may exit the stream 20 through a manual selection of button 3250, or through the ending of a participation time period specified by the user computer system 110, the luminary computer system 120, or the system server 100 itself. If a user computer system 110 had just left the stream 20, step 3670 will ensure that the departing user computer system 110 is billed for their time in the stream 20 (assuming that this was not a free meet now stream created through button 2550). If step 3665 determines that there are no open slots, step 3675 determines whether the luminary computer system 120 has ended the stream 20. If not, participation continues at 3660 until an open slot is created by a user computer system 110 leaving the stream 20, or the luminary computer system 120 terminates the stream 20.

If a new user computer system 110 requests to join the stream 20 at step 3630 but step 3635 determines that the stream 20 is full, the user computer system 110 will receive a communication (interface 2900) concerning the need to join a queue, and then be placed into the queue at step 3640. Step 3640 makes sure that the newly added user computer system 110 is placed into the correct location in the queue. In some embodiments, the queue is a simple, first-in, first-out (or FIFO) queue. In other embodiments, an auction bid can be submitted. If a bid is submitted in this embodiment, step 3645 will detect the bid and then cause step 3640 to re-sort the queue to reflect the new bid. As explained above in connection with FIG. 3500, auction bids change the sorting of the queue. Step 3650 ensures that the first user computer system 110 in the queue (after the sorting of step 3640) is added to the stream 20 at step 3655 whenever the queue is non-empty.

If the luminary computer system 120 terminates the stream 20, this is detected at step 3675. At step 3680, the user computer systems 110 participating in the stream 20 are informed of the termination and are then billed appropriately. At step 3685, the luminary computer system 120 is compensated according to the rules established by the system 10 and the money collected through steps 3670 and 3680. At step 3690, the participants (including both user computer systems 110 and luminary computer system 120) are given access to the recorded communication 180 and any portions 190 that each had created. The method ends at step 3695.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method comprising:
    a) at a system server, receiving a request to establish a live audio-visual stream from an organizer computer system;
    b) at the system server, establishing and transmitting the live audio-visual stream using audio data and visual data received from the organizer computer system and all user computer systems that participate in the live audio-visual stream, wherein the live audio-visual stream has slots available for user computer systems, further wherein only a predefined number of slots are available in the live audio-visual stream;
    c) at the system server, receiving original requests to join the live audio-visual stream from the predefined number of original user computer systems;
    d) at the system server, placing the original user computer systems into the predefined number of slots in the live audio-visual stream;
    e) at the system server, receiving an additional request to join the live audio-visual stream from an additional user computer system;
    f) at the system server, placing the additional user computer system into a queue, wherein the additional user computer system becomes a queued user computer system;
    g) at the system server, removing a first original user computer system from the live audio-visual stream, wherein a first slot is opened in the live audio-visual stream; and
    h) at the system server, placing a first-positioned queued user computer system into the first slot so that the first-positioned queued user computer system participates in the live audio-visual stream.

2. The method of claim 1, wherein the additional user computer system is the only user computer system in the queue, further wherein the additional user computer system is the first-positioned queued user computer system.

3. The method of claim 1, wherein the queue has a plurality of other queued user computer systems in addition to the additional user computer system, further where the queued user computer systems are sorted to determine the first-positioned queued user computer system.

4. The method of claim 3, wherein the queued user computer systems are sorted in a first-in, first-out manner.

5. The method of claim 3, further comprising: at the system server, receiving an auction bid from the additional user computer system, wherein the queued user computer systems are firstly sorted according to the sizes of auction bids received from the sorted queued user computer systems and secondly sorted in a first-in, first-out manner.

6. The method of claim 5, wherein auction bids are paid by user computer systems only after the user computer systems participate in the live audio-visual stream.

7. The method of claim 1, further comprising, at the system server and after receiving the request to establish the live audio-visual stream, creating a URL link to an Internet location that generates requests to join the live audio-visual stream.

8. The method of claim 1, further comprising, at the system server, receiving compensation paid by the user computer systems that participate in the live audio-visual stream, wherein compensation is based on a time duration for that participation.

9. The method of claim 8, wherein the first original user computer system provided compensation for a time period, wherein the first original user computer system was removed by the system server after the first original user computer system participated in the live audio-visual stream for the time period.

10. The method of claim 1, further comprising providing a user interface to the organizer computer system including an interface element to end the live audio-visual stream; further comprising, at the server system, receiving selection of the interface element from the organizer computer system and then terminating the live audio-visual stream.

11. The method of claim 1, further comprising:
    i) establishing a set time period for user participation,
    ii) at the server system, removing all of the original user computer systems after the set time period to open all predefined number of slots,
    iii) at the server system, placing the predefined number of queued user computer systems, including the additional user computer system, into the predefined number of slots so that the predefined number of queued user computer systems participate in the live audio-visual stream.

12. A method comprising:
    a) at a system server, receiving a request to establish a live audio-visual stream from an organizer computer system;
    b) at the system server, establishing and transmitting the live audio-visual stream using audio data and visual data received from the organizer computer system and all user computer systems that participate in the live audio-visual stream, wherein the live audio-visual stream has slots available for user computer systems, further wherein only a predefined number of slots are available in the live audio-visual stream;

c) at the system server, receiving original requests to join the live audio-visual stream from the predefined number of original user computer systems;

d) at the system server, placing the original user computer systems into the predefined number of slots in the live audio-visual stream;

e) at the system server, receiving at least the predefined number of additional requests to join the live audio-visual stream from additional user computer systems;

f) at the system server, placing the additional user computer systems into a queue;

g) at the system server, and at a set time period after placing the original user computer systems into the predefined number of slots, removing original user computer systems from the live audio-visual stream, wherein the predefined number of slots are opened in the live audio-visual stream;

h) at the system server, placing the predefined number of additional user computer systems into the predefined number of slots so that the predefined number of additional user computer system participate in the live audio-visual stream; and i) at the system server, and at the set time period after placing the predefined number of additional user computer systems into the predefined number of slots, removing the predefined number of additional user computer systems from the live audio-visual stream.

13. The method of claim 12, wherein the set time period is five minutes.

14. The method of claim 12, further comprising receiving compensation paid by the user computer systems that participate in the live audio-visual stream.

15. The method of claim 12, wherein the additional user computer systems in the queue are sorted to determine which additional user computer systems comprise the predefined number of additional user computer systems, and further comprising at the system server, receiving auction bids from the additional user computer systems, wherein the queued user computer systems are firstly sorted according to the sizes of auction bids received from the additional user computer systems and secondly sorted in a first-in, first-out manner.

16. A system server comprising:

a) a processor for processing programming instructions;

b) a network interface permitting the system server to communicate over a network with a plurality of computer systems;

c) application programming instructions causing the system server to:

i) receive a request to establish a live audio-visual stream from an organizer computer system, ii) establish and transmit the live audio-visual stream using audio data and visual data received from the organizer computer system and all user computer systems that participate in the live audio-visual stream, wherein the live audio-visual stream has slots available for user computer systems, further wherein only a predefined number of slots are available in the live audio-visual stream, iii) receive original requests to join the live audio-visual stream from the predefined number of original user computer systems, iv) place the original user computer systems into the predefined number of slots in the live audio-visual stream, v) receive an additional request to join the live audio-visual stream from an additional user computer system, vi) place the additional user computer system into a queue, wherein the additional user computer system becomes a queued user computer system joining other queued user computers systems in the queue, vii) remove a first original user computer system from the live audio-visual stream, wherein a first slot is opened in the live audio-visual stream, and viii) place a first-positioned queued user computer system into the first slot so that the first-positioned queued user computer system participates in the live audio-visual stream.

17. The system of claim 16, wherein the application programming instructions cause the system server to sort the queued user computer systems in a first-in, first-out manner.

18. The system of claim 16, wherein the application programming instructions cause the system server receive auction bids from the queued user computer systems, wherein the queued user computer systems are firstly sorted according to the sizes of auction bids received from the queued user computer systems and secondly sorted in a first-in, first-out manner.

19. The system of claim 18, wherein auction bids are paid by queued user computer systems only after the queued user computer systems participate in the live audio-visual stream.

20. The system of claim 16, wherein the application programming instructions further cause the system server to:

(1) establish a set time period for user participation, (2) remove all of the original user computer systems after the set time period to open all predefined number of slots, and (3) place the predefined number of queued user computer systems, including the additional user computer system, into the predefined number of slots so that the predefined number of queued user computer systems participate in the live audio-visual stream.

* * * * *